United States Patent
Kanetsuku et al.

(10) Patent No.: US 6,449,223 B1
(45) Date of Patent: Sep. 10, 2002

(54) LIBRARY APPARATUS FOR DISC CARTRIDGE

(75) Inventors: Toshihito Kanetsuku; Kenichi Utsumi, both of Kawasaki; Takahisa Miyamoto, Inagi; Yutaka Sugai, Inagi; Hitoshi Saito, Inagi; Hideaki Yoshida, Inagi; Osamu Ohmori, Kawasaki, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/048,646

(22) Filed: Mar. 26, 1998

(30) Foreign Application Priority Data

Sep. 25, 1997 (JP) .............................. 9-259714

(51) Int. Cl.⁷ .............................................. G11B 33/04
(52) U.S. Cl. ............... 369/30.41; 369/30.4; 211/41.12; 360/92
(58) Field of Search .......................... 369/75.1, 34, 36, 369/178, 179, 191, 30.4; 360/98.04, 92; 361/724, 736, 650, 426, 684; 108/111; 312/111; 211/41.12

(56) References Cited

U.S. PATENT DOCUMENTS

| | | | | |
|---|---|---|---|---|
| 4,334,261 A | * | 6/1982 | Gonzales | 361/426 |
| 4,949,648 A | * | 8/1990 | Miller | 108/111 |
| 5,303,214 A | * | 4/1994 | Kulakowski et al. | 369/34 |
| 5,426,567 A | * | 6/1995 | Opeka | 361/740 |
| 5,442,500 A | * | 8/1995 | Hidona et al. | 360/22 |
| 5,477,594 A | * | 12/1995 | LePage | 27/1 |
| 5,486,041 A | * | 1/1996 | Sykes | 312/111 |
| 5,646,917 A | * | 7/1997 | Miyoshi et al. | 369/34 |
| 5,742,570 A | | 4/1998 | Taki et al. | 369/36 |
| 5,784,249 A | * | 7/1998 | Pouliot | 361/622 |
| 5,967,339 A | * | 10/1999 | Utsumi et al. | 211/41.12 |
| 6,008,995 A | * | 12/1999 | Pusateri et al. | 361/796 |
| 6,064,543 A | * | 5/2000 | Tatsuda | 360/92 |
| 6,094,342 A | * | 7/2000 | Dague et al. | 361/685 |

FOREIGN PATENT DOCUMENTS

| | | |
|---|---|---|
| JP | 63-127174 | 8/1988 |
| JP | 8-235730 | 9/1996 |
| JP | 8-273268 | 10/1996 |
| JP | 9-55009 | 2/1997 |

* cited by examiner

*Primary Examiner*—Brian E. Miller
*Assistant Examiner*—Tianjie Chen
(74) *Attorney, Agent, or Firm*—Greer, Burns & Crain, Ltd.

(57) ABSTRACT

The present invention relates to a library apparatus capable of enhancing the coupling accuracy and the positioning accuracy among a plurality of lockers to bring up the traveling accuracy and positional accuracy of an accessor within a passage penetrating the lockers so that the accessor can surely accomplish the insertion/extraction of a cartridge into/from a storage rack or a deck. For this purpose, a supporting member which holds a rail for guiding the accessor along a direction of coupling the plurality of lockers within the passage is installed in the coupling direction for each of the lockers, and a positioning groove in which a bar-like tool is fitted when positioning the adjacent lockers with respect to each other is made in an end portion of the supporting member in the coupling direction. This invention is applicable to a large-capacity external memory system storing a large number of cartridges such as magnetic tape cartridges and optical disk cartridges.

10 Claims, 27 Drawing Sheets

LIBRARY APPARATUS FOR DISC CARTRIDGE

BACKGROUND OF THE INVENTION

1) Field of the Invention

The present invention relates to a library apparatus which stores a large number of cartridges such as magnetic tape cartridges and optical disk cartridges, and which transfers the cartridges through an accessor to a deck for processing a storage medium accommodated within each of the cartridges, and more particularly to a library apparatus constructed by coupling a plurality of lockers and having a traveling passage for accessors which is formed to penetrate the plurality of lockers.

2) Description of the Related Art

In general, a library apparatus functions as a large-capacity external storage memory, and a storage rack in its locker stores several thousands of cartridges each accommodating, for example, a magnetic tape as a storage medium, and access such as write/read of recording/recorded data is automatically done in relation to the storage medium within each of the cartridges.

Furthermore, the library apparatus is equipped with the aforesaid storage rack for storing the cartridges, a plurality of magnetic tape decks (which will be referred hereinafter to as decks) for conducting access such as write/read of recording/recorded data with respect to a storage medium (magnetic tape) within a cartridge, and an accessor (cartridge transferring robot) for performing the conveyance of the cartridges between the storage rack and the decks.

Commonly, this library apparatus is made up of a storage unit having a storage rack for storing a large number of cartridges, a drive unit incorporating decks, an accessor unit functioning as a garage for accessors, a unit including a controller or the like for controlling the accessors, and other units.

Each of these units is constructed as being one locker, and the arrangement of the whole library apparatus relies on the connections among a plurality of lockers (units). In addition, with the plurality of lockers being in connection, a traveling passage for the accessors is defined in these lockers to penetrate them.

In the library apparatus thus arranged, in response to an access request to one cartridge from a host unit or the like, the accessor travels within the passage to come to the storage rack to search a directing cartridge there, and subsequently, a hand mechanism grips that cartridge and transfers it to the deck for insertion into the deck.

With these operations, in that deck, given processing is one in relation to the storage medium (magnetic tape) within the inserted cartridge. After the completion of the processing, the cartridge discharged from the deck is again gripped by the hand mechanism and conveyed by the accessor up to the storage rack to be stored at a given position.

In the prior library apparatus, a dedicated cartridge delivering and receiving mechanism is provided at every deck, and the insertion/extraction of the cartridge into/from the deck are done through the use of this cartridge delivering and receiving mechanism. That is, the accessor is not made to directly carry out the insertion/extraction of the cartridge into/from the deck.

Recently, for the purpose of the size and cost reduction of the library apparatus, requirements have arisen for enabling the accessor to directly conduct the insertion/extraction of the cartridge with respect to the deck without the interposition of the cartridge delivering and receiving mechanism. For meeting the requirements, in addition to enhancing the control accuracy of the hand mechanism of the accessor, there is a need to enhance the traveling accuracy and positional accuracy of the accessor within the locker penetrating passage in a manner of improving the coupling accuracy and positioning accuracy among the plurality of lockers.

In the construction of the library apparatus, merely coupling the plurality of lockers can not provide the sufficient coupling accuracy and the positioning accuracy, so that difficulty can be encountered for the accessor to find the cartridge stored position with a high accuracy and further to carry out the insertion/extraction of a cartridge into/from a given cell of the storage rack or a given deck.

SUMMARY OF THE INVENTION

The present invention has been developed with a view to eliminating such a problem, and it is therefore an object of this invention to provide a library apparatus which is capable of enhancing the coupling accuracy and the positioning accuracy among a plurality of lockers to the traveling accuracy and positional accuracy of an accessor within a passage penetrating these lockers so that the accessor can surely accomplish the insertion/extraction of a cartridge into/from a storage rack or a deck.

For this purpose, in accordance with the present invention, a library apparatus comprises a storage rack for storing cartridges each accommodating a storage medium, a deck for carrying out access to the storage medium within the cartridge, and an accessor for transferring the cartridge between the storage rack and the deck, and is constructed by coupling a plurality of lockers in which a traveling passage for the accessor lies to penetrate the plurality of lockers, wherein a supporting member which holds a rail for guiding the accessor along a direction of coupling the plurality of lockers within the passage is installed in the coupling direction for each of the lockers, and a positioning groove in which a bar-like tool is fitted when positioning the adjacent lockers with respect to each other is made in an end portion of the supporting member in the coupling direction.

In the library apparatus thus arranged according to this invention, for coupling the lockers adjacent to each other, in a state where the adjacent lockers are disposed in an opposed relation to each other, the bar-like tool is fitted in both the positioning grooves of the supporting members of these lockers, so that the supporting members are positioned in terms of the directions perpendicular to the locker coupling direction, which can ensure the coupling accuracy and the positioning accuracy among the plurality of lockers and further permit the rail to have a high linearity. Accordingly, the accessor can surely accomplish the insertion/extraction into/from the storage rack or the deck.

In this case, it is also appropriate that, in order for the accessor to recognize its position at operation, a flag member is fitted in the vicinity of the supporting member through a screw set downwardly from the above. The way of setting the screw from the above allows the flag member to be attached to narrow portion in the vicinity of the supporting member, thus sharply improving the locker installation working efficiency.

In addition, a library apparatus according to this invention comprises a storage rack, a deck and an accessor and is constructed by coupling a plurality of lockers in which a traveling passage for the accessor is formed to penetrate them as well as the first-mentioned library apparatus, wherein sheet metal columns having a standardized structure are set vertically at corner portions of the lockers, and a plane reference plate having a vertical surface parallel to the coupling direction of the plurality of lockers and an edge surface perpendicular to the same coupling direction is attached to each of the sheet metal columns, with the vertical surface of the plane reference plate being used as a reference plane when positioning one locker with respect to the adjacent locker.

In the library apparatus thus arranged according to this invention, in coupling two adjacent lockers to each other, in a state where the two lockers are disposed to be adjacent to each other, the verticality of the lockers relative to the installation surface is adjustable while a linear member such as a metallic scale is placed concurrently into contact with the plane reference plates of the two sheet metal columns, with the result that these two lockers can be installed at the same verticality, which can ensure the coupling accuracy and the positioning accuracy among the plurality of lockers. Accordingly, the accessor can certainly accomplish the insertion/extraction of the cartridge into/from the storage rack or the deck.

In addition, it is also appropriate that a cable duct located on a base within each of the lockers in the locker coupling direction for accommodating and guiding a cable is divided into three sections along the locker coupling directions, and a central section of the three divisions of the cable duct is fixed to the locker, whereas both the end sections thereof are detachably attached to the locker. In this case, by detaching the end sections of the cable duct, base legs or the like installed under the cable duct becomes easily adjustable, thus remarkably bringing up the locker installation working efficiency.

Furthermore, in case where a shelf accommodating a plurality of printed boards functioning as a controller for the accessor is housed in at least one of the plurality of lockers, the inserting direction of a screw for fitting a back panel of the shelf to the shelf assumes only a direction perpendicular to the back panel. In this case, since the inserting direction of the back panel fitting screw is only one direction (the direction normal to the back panel), it is possible to easily conduct the back panel attaching/detaching work and hence to sharply improve the working efficiency at the maintenance and replacement of the back panel.

DESCRIPTION OF THE PREFERRED EMBODIMENTS

An embodiment of the present invention will be described hereinbelow with reference to the drawings.

[1] Description of Entire Arrangement of Library Apparatus

First of all, referring to FIGS. 1 to 3, a description will be made hereinbelow of the entire arrangement of a library apparatus according to an embodiment of this invention.

Figure 1:
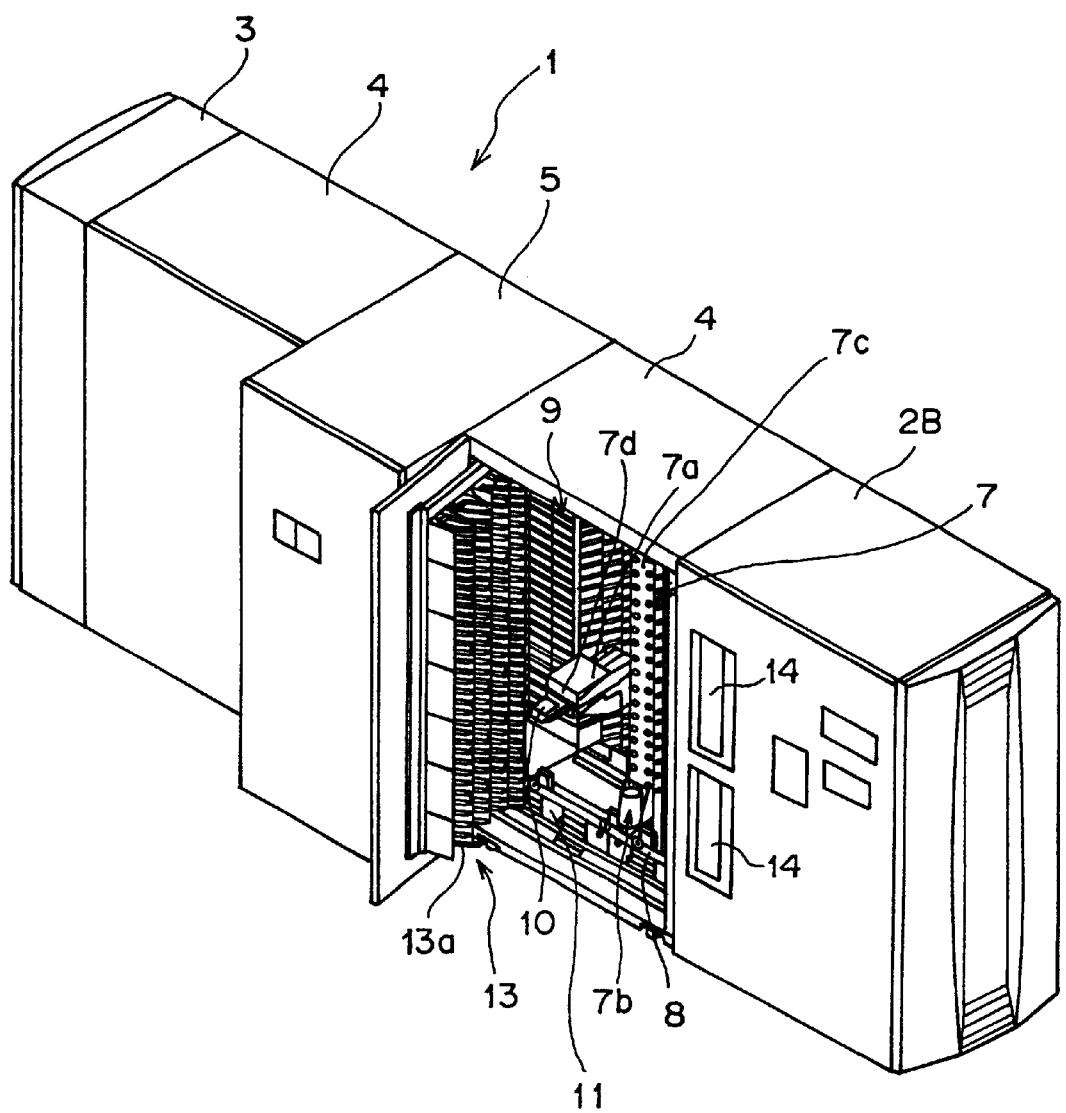
FIG. 1 is a perspective view showing an appearance of a structural example of an library apparatus according to an embodiment of the present invention.
Figure 2A:
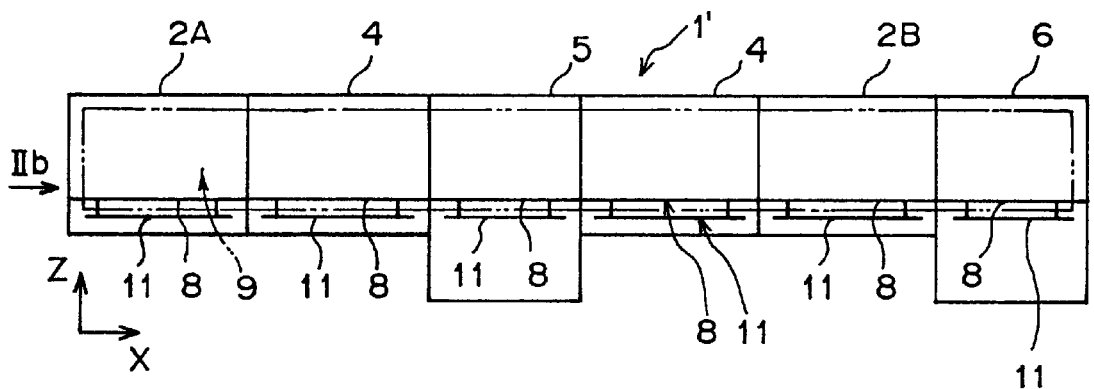
FIGS. 2A and 2B are respectively a plan view and a side elevational view (illustration of a portion pointed out by an arrow IIb) each illustratively showing another structural example of the library apparatus according to the embodiment of this invention.
Figure 2B:
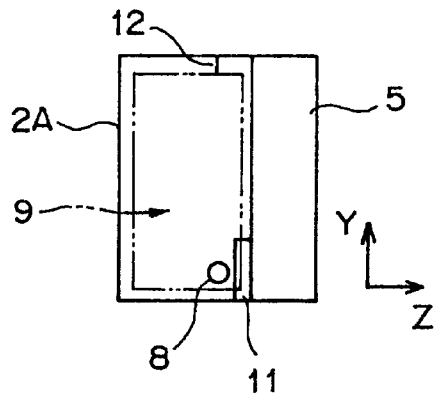
Figure 3:
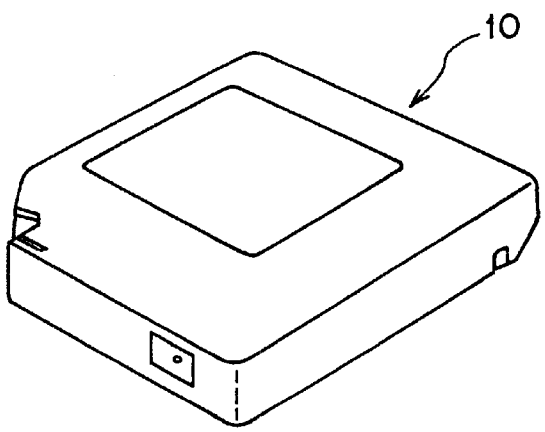
FIG. 3 is a perspective view showing an cartridge in this embodiment.

FIG. 1 is a perspective view showing an appearance of a structural example of a library apparatus according to the embodiment of this invention, FIGS. 2A and 2B are plan and side elevational views illustratively showing another structural example of the library apparatus according to the embodiment of this invention, and FIG. 3 is a perspective view showing a cartridge to be handled in the library apparatus according to this embodiment. FIG. 2B corresponds to an illustration of a portion indicated by an arrow IIb in FIG. 2A.

Both the FIG. 1 library apparatus 1 and FIGS. 2A, 2B library apparatus 1' store a large number of magnetic tape cartridges 10 (see FIG. 3; cartridges each accommodating a magnetic tape as a storage medium; which will be referred hereinafter to as a cartridge), and carry out access such as write/read of recording/recorded data in/from each of the magnetic tape cartridges 10.

The library apparatus 1 shown in FIG. 1 is composed of an accessor unit [which will be referred hereinafter to as an RAU (Right Accessor Unit)] 2B, an accessor terminal [which will be referred hereinafter to as an LAT (Left Accessor Terminal)] 3, left and right cartridge storage units (which will be referred hereinafter to as CSUs)4, 4, and a tape drive mount unit (which will be referred hereinafter to as a TMU) 5, which are in a connected relation to each other. Also included in the apparatus 1 is one accessor (cartridge transferring robot) 7 which travels within these units 2B and 3 to 5 to transfer the cartridge 10. FIG. 1 shows a state where an outer wall surface of the left-side CSU 4 is broken so that the interior of the CSU4 is looked into from the external.

On the other hand, the library apparatus 1' shown in FIGS. 2A and 2B is made up of two left and right accessor units (which will be referred hereinafter to as LAU, RAU, respectively) 2A, 2B, two left and right CSUs4, 4, a TMU 5 and an accessor extend unit (which will be referred hereinafter to as an AEU) 6 which are in a coupled relation to each other. Further included in the apparatus 1' are left and right accessors 7 which travel within these units 2A, 2B and 4 to 6 to transfer the cartridge 10.

The LAU 2A and RAU 2B function as garages for the accessors 7, respectively, and on the front side of the RAU 2B (the external space side, that is, the side where the operator operates the apparatus), as shown in FIG. 1, there are provided a pair of upper and lower cartridge entry/exit stations [each of which will be referred hereinafter to as a CAS (Cartridge Access Station)] 14, 14 for carrying out the entry or exit of the cartridge 10 into or from the library apparatus 1. In FIGS. 2A and 2B, the CASs 14 are omitted from the illustration. In addition, the LAU 2A and the RAU 2B are equipped with a cartridge forced exit station (which will be referred hereinafter to as an FES; see reference numeral 15 in FIGS. 20 and 21) which is designed to forcibly discharge a defective cartridge to the external.

Each of the CSUs 4 is for storing a large number of cartridges 10, and as shown in FIG. 1, an inner wall surface of the CSU4 bears a storage rack 13 comprising a large number of cells 13a for storing the corresponding number of cartridges 10 and the accessor 7 one by one puts the cartridges 10 coming from the CAS 14 or a DEE (which will be mentioned below) in the respective cells 13a.

Incidentally, in this embodiment, although not shown, the CSU4 can be provided with a plurality of cartridge direct entry/exit stations (each of which will be referred hereinafter to as a DEE), and in each of the DEEs, a magazine storing a plurality of cartridges 10 is set in order to permit the simultaneous entry or exit of the plurality of cartridges 10 into or from the library apparatus 1 or 1'.

The TMU 5 has a plurality of magnetic tape decks (recording/reproduction units, MTUs; which will be referred hereinafter to as decks), and each of the decks conducts, for example, the write/read processing of recording/recorded data onto/from a magnetic tape within the cartridge 1 0 transferred by the accessor 7.

As will be described in detail with reference to FIG. 18, the AEU 6 includes a power source 16 (see FIG. 18) for supply of an operating power to the accessor 7 and a controller 17 (see FIG. 18) for taking the charge of control of the accessors 7.

The LAT 3 is, as shown in FIG. 1, a locker installed at a left end portion of the library apparatus 1 in the case of taking a system arrangement with no AEU6.

Each of the above-described units 2A, 2B and 3 to 6 is made as being a locker 20 which will be described herein later with reference to FIGS. 5 to 7, and each of the library apparatus 1 and 1' is constructed by coupling the lockers 20 organizing given units to each other.

Furthermore, formed in each of the library apparatus 1 and 1' is a traveling passage (accessor passage) 9 for the accessors 7 which penetrates the units 2A, 2B and 3 to 6.

Still further, in a lower section of the passage 9, a rail (X rail) 8 for guiding the lower section side of the accessor 7 along the unit coupling directions (in the description below, also referred to as locker coupling directions) is laid in a state of being supported by a rack support 11, which allows the accessor 7 to move within the passage 9. Besides, in an upper section (the lower surface of a top board 22; see FIG. 5 or 8) of the passage 9, a top rail 12 is installed to guide the upper section side of the accessor 7 along the unit coupling direction within the passage 9.

As shown in FIG. 1, in addition to a hand mechanism 7d for holding the cartridge 10 to perform the insertion/extraction thereof, the accessor 7 involves a carriage 7b movable in the horizontal directions along the X rail 8 for moving a hand assembly 7a including this hand mechanism 7d up to a given position and a vertical column 7c for vertically guiding the hand assembly 7a on the carriage 7b.

For the description of this embodiment, as shown in FIGS. 2A and 2B, the unit coupling direction is taken to be an X direction (the left or right direction in FIG. 2A), the front to rear direction of the units is taken as a Z direction (the vertical direction in FIG. 2A, the left or right direction in FIG. 2B), and the vertical direction of the units is taken as a Y direction (the vertical direction in FIG. 2B).

In the library apparatus 1 or 1' thus constructed, the cartridge 10 from the CAS 14 or the DEE is gripped and taken out one by one by the hand mechanism 7d of the accessor 7 and is inserted into and stored in a given cell 13a of the storage rack 13 after being carried through the passage 9 by the accessor 7.

Furthermore, of a large number of cartridges 10 stored in the cells 13a of the storage rack 13, a cartridge(s) 10 specified by a host unit is gripped and pulled out by the hand mechanism 7d of the accessor 7 and then transferred by the accessor 7 through the passage 9 to a given deck of the TMU 5 to be inserted thereinto.

In the deck, after the recording/reproduction processing on/from the magnetic tape housed in the cartridge 10, the cartridge 10 staying within the deck is discharged therefrom and gripped and taken out by the hand mechanism 7d of the accessor 7 and subsequently inserted into and stored in a given cell 13a of the storage rack 13 by the accessor 7 after passing through the passage 9.

Incidentally, for discharging the cartridge(s) 10 stored in the storage rack 13 to the exterior of the library apparatus 1 or 1', the cartridge 10 to be discharged is gripped by the hand mechanism 7d of the accessor 7 to be taken out from the storage unit 13 and then transferred through the passage 9 to the CAS 14 or the DEE by the accessor 7 to be inserted into a given position (cell) of the CAS 14 or the DEE

[2] Description of Accessor

Secondly, referring to FIG. 4, a brief description will be taken hereinbelow of an arrangement of the accessor 7.

Figure 4:
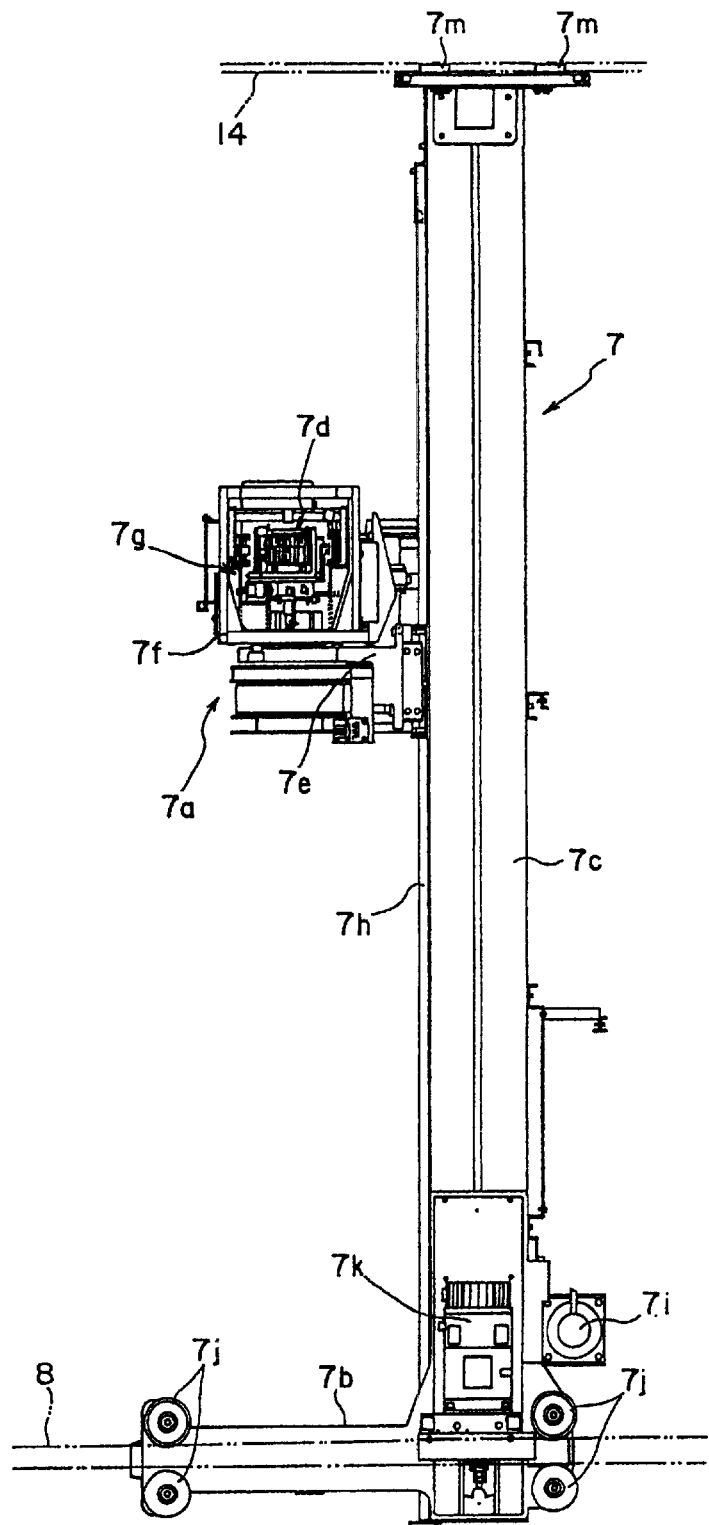
FIG. 4 is a front elevational view showing an accessor in this embodiment.

FIG. 4 is a front elevational view showing the accessor 7 in this embodiment. As shown in FIG. 4, the accessor 7 is, as mentioned before, composed of the hand assembly 7a including the hand mechanism 7d, the carriage 7b and the vertical column 7c.

The hand assembly 7a is constructed in such a manner as to place a picker section 7g including the hand mechanism 7d through a tilt base 7f on a supporting base 7e. The hand mechanism 7d is mounted on the picker section 7g to be movable in the forward and backward directions, and is sliding-driven by a drive mechanism (not shown) in the forward and backward directions.

Furthermore, in this embodiment, since the angles to be taken at the insertion/extraction of the cartridge 10 differ from each other among the units and there is a need to change the cartridge insertion/extraction angle by the hand mechanism 7d, the picker section 7g is swingably fitted to the tilt base 7f and is swingingly driven by a tilt mechanism (not shown) so that the angle of the cartridge insertion/extraction direction is adjustable with respect to a horizontal plane.

For instance, as the cartridge insertion/extraction directions (angle) of the hand mechanism 7d in the embodiment, there are taken two directions: a horizontal direction (0°) and a direction looking downward by a given angle with respect to the horizontal direction. In the case of the deck of the TMU 5, the cartridge 10 is commonly inserted and pulled out into/from the horizontal direction (0°). On the other hand, in the case of the storage unit 13 of the CSU 4 or the like, the cartridge 10 is stored in a condition looking (inclined) downward (for example, by 12°) relative to the horizontal direction to prevent them from dropping from the cells 13a of the storage rack 13 due to the vibrations caused by earthquakes and others, and therefore, the insertion and extraction of the cartridge 10 is made at that angle.

Still further, the hand mechanism 7d, the picker section 7g and the tilt base 7f are mounted onto the supporting base 7e to be revolvable around vertical shafts by a drive mechanism (not shown).

The supporting base 7e constituting the hand assembly 7a is mounted onto the vertical column 7c to be slidable up and down while being guided by a guide rail 7h installed vertically along the vertical column 7c. In addition, the supporting base 7e is coupled to a belt (not shown; a belt wound around a pair of upper and lower pulleys incorporated into upper and lower locations of the vertical column 7c). On rotationally driving his belt by a belt elevating drive motor 7i, the supporting base 7e, that is, the whole hand assembly 7a, is shifted up and down to be positioned at a given height.

The carriage 7b is integrally connected to a lower end side of the vertical column 7c to travel along the X rail 8 while supporting the vertical column 7c. To this carriage 7b, there are pivotally fitted two pairs (sets) of upper and lower traveling rollers 7j, 7j which are arranged in the forward and backward directions and which are made to roll in accordance with the traveling of the carriage 7b in a state of sandwiching the X rail 8 from the above and below.

The X rail 8 has a traveling drive rack (not shown) formed along its longitudinal direction. Further, the carriage 7b is equipped with a pinion (not shown) which is geared with that rack to be rotationally driven by a traveling drive motor 7k.

Moreover, to an upper end side of the vertical column 7c, there are pivotally fitted two pairs (sets) of upper and lower guide rollers 7m, 7m which are arranged in the forward and backward directions and which are made to roll in accordance with the traveling of the carriage 7b in a state of horizontally sandwiching the top rail 12.

Thus, when the traveling drive motor 7k rotationally drives the pinion, with the pinion and the traveling drive rack being engaged with each other, the whole accessor 7 is moved along the unit coupling directions (X direction) along the X rail 8 and the top rail 12. Further, when the elevating drive motor 7i rotates the aforesaid belt, the whole hand assembly 7a is moved in the vertical directions (Y direction) along the vertical column 7c. In this way, the hand assembly 7a (the picker section 7g including the hand mechanism 7d) moves to a given position within a plane including the X rail 8 and the vertical column 7c to be positioned thereat.

[3] Description of Locker Structure and Locker Installation Procedure

[3-1] Description of Locker Frame Structure

Figure 5:
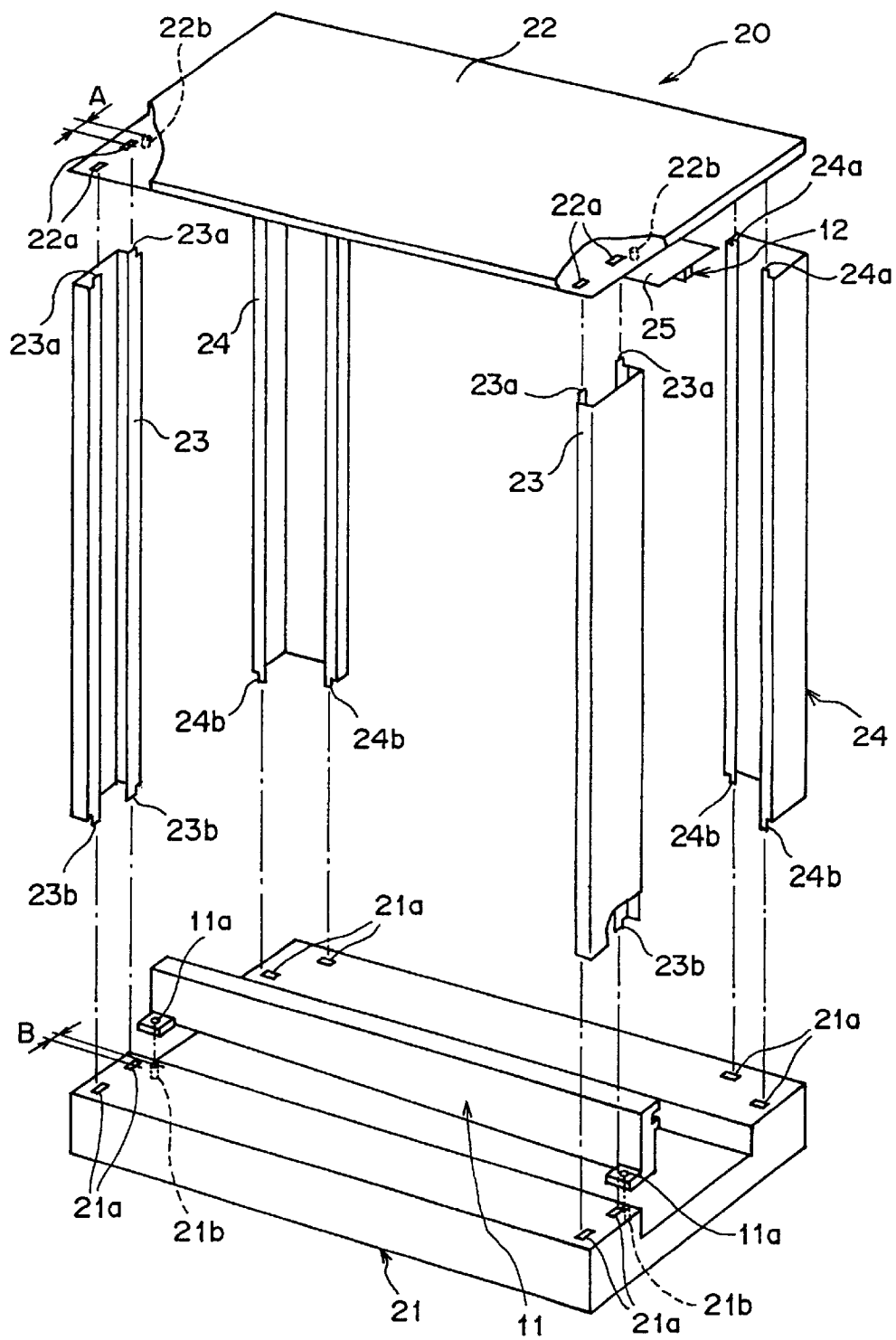
FIG. 5 is a partially broken exploded perspective view showing a locker frame structure in this embodiment.
Figure 6:
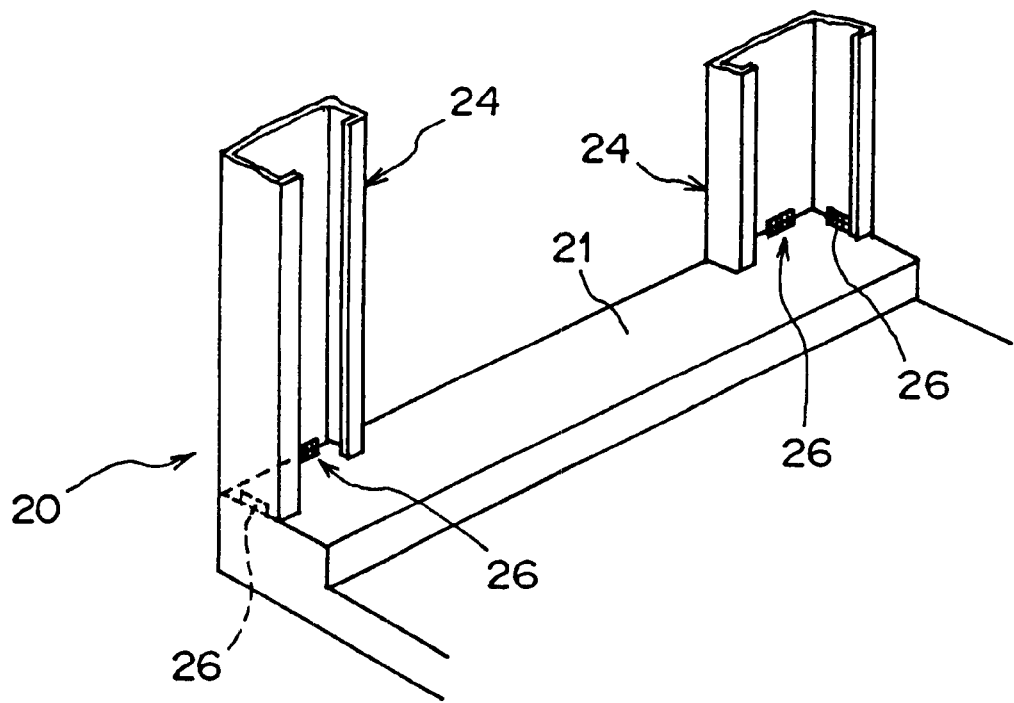
FIG. 6 is a perspective view showing welded sections of the locker frame structure in this embodiment.
Figure 7:
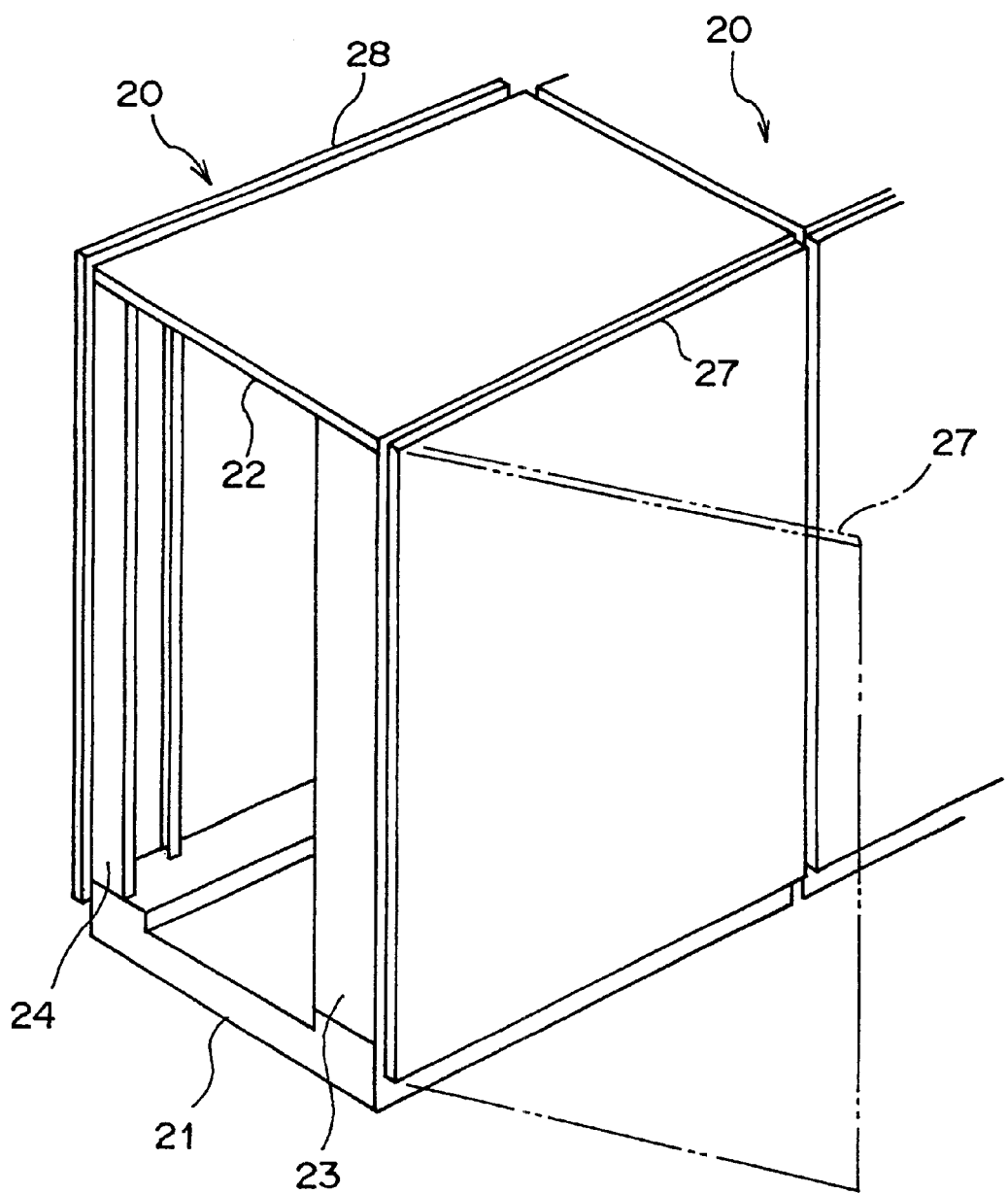
FIG. 7 is a perspective view showing a locker in this embodiment.

Each of the units 2A, 2B and 3 to 6 organizing the library apparatus 1 or 1' according to this embodiment is constructed as being a locker 20 shown in FIGS. 5 to 7. FIG. 5 is an exploded perspective view showing a frame structure of the locker 20, FIG. 6 is a perspective view showing welded portions in the frame structure of the locker 20, and FIG. 7 is a perspective view showing the locker 20.

As shown in FIG. 5, the frame structure of the locker 20 constituting the library apparatus 1, 1' according to this embodiment is made up of a locker base 21, a top board 22, front side sheet metal columns 23, 23 installed vertically at corner portions between the locker base 21 and the top board 22, and rear side sheet metal columns 24, 24 similarly installed vertically therebetween. In this case, all the sheet metal columns 23, 24 of the locker 20 composing the various units 2A, 2B and 3 to 6 have the same standardized (unifited) structure (configuration). In more detail, the respective sheet metal columns 23, 24 undergo the bending-formation to protrude toward the exterior of the locker 20 into a convexity.

Each of the sheet metal columns 23 has two projecting portions 23a and two projecting portions 23b at its upper and lower end sections, while each of the sheet metal columns 24 has two projecting portions 24a and two projecting portions 24b at its upper and lower end sections.

And not only that, the base 21 and the top board 22 have positioning rectangular or square holes (positioning holes) 21a, 22a, respectively.

Each of the rectangular holes 21a, 22a is two in number in terms of each of the sheet metal columns 23, 24, and the projecting portions 23a, 23b of the sheet metal column 23 are respectively fitted in the rectangular holes 21a, 22a while the projecting portions 24a, 24b of the sheet metal column 24 are fitted in the rectangular holes 21a, 22a, so that the sheet metal columns 23, 24 are positioned with respect to the locker base 21 and the top board 22.

Besides, in the locker 20, the rack support (supporting member) 11 sits on the locker base 21 in the locker coupling directions, and reference pins 21b, 21b for positioning the rack support 11 are planted on the upper surfaces of both end portions of the locker base 21, respectively.

Both end portions of the rack support 11 have positioning holes 11a, 11a, respectively, and the reference pins 21b, 21b on the locker base 21 are engaged with these positioning holes 11a, 11a, so that the rack support 11, that is, the X rail 8 born by this rack support 11, is positioned with respect to the locker base 21.

Figure 13:
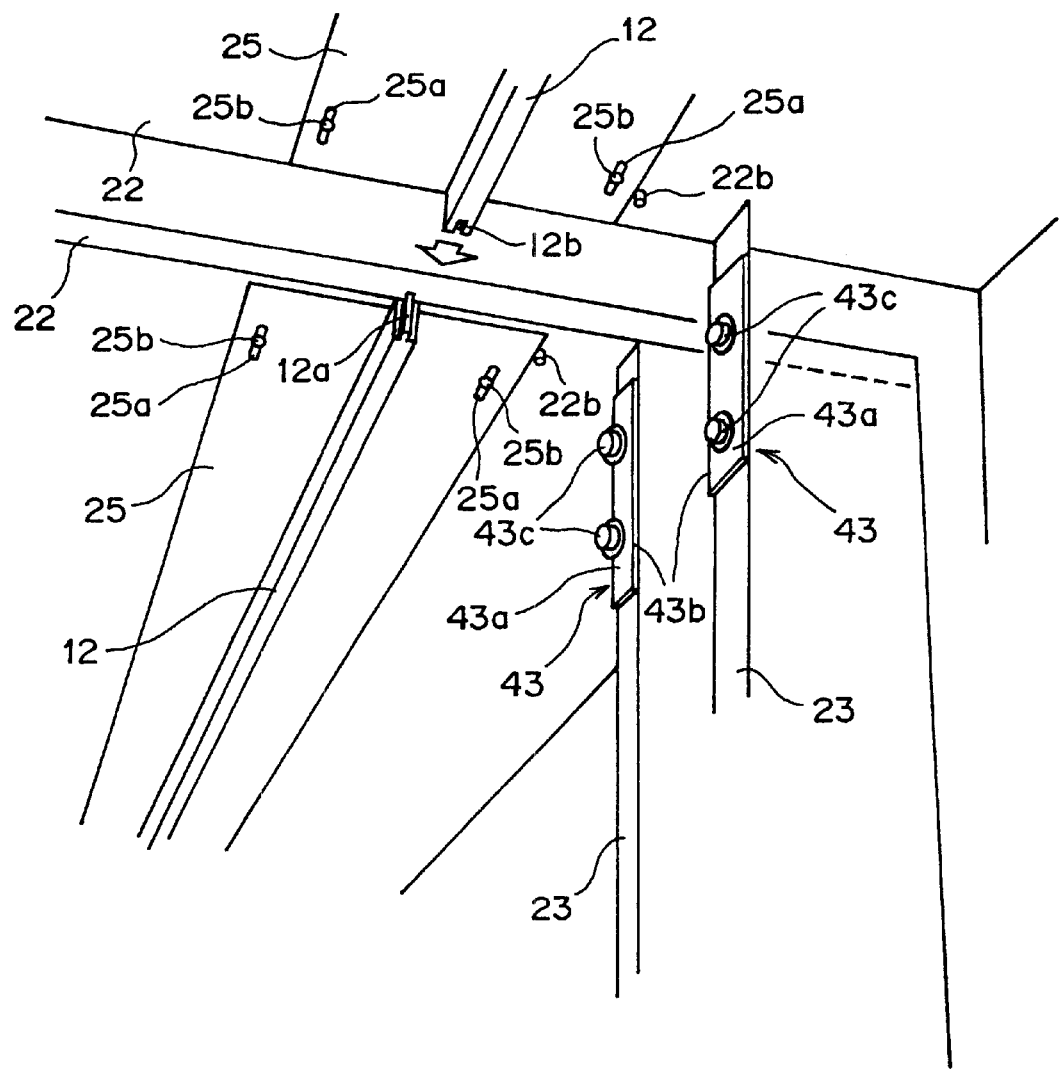
FIG. 13 is a perspective view showing a connecting section of a locker, in a state of looking upwardly from its inner side, for explaining a plane reference plate and a top rail connecting section in this embodiment.

In addition, reference pins 22b, 22b for positioning the top rail 12 are protrusively disposed on the lower surface of both end portions of the top board 22. The top rail 12 is protrusively placed on a bearing plate 25 as shown in FIG. 1 or 13, and is attached through this bearing plate 25 to the lower surface of the top board 22. Further, in a manner that the front side end edge of the bearing plate 25 is brought into contact with the reference pins 22b, 22b, the bearing plate 25, that is, the top rail 12, is positioned in relation to the top board 22.

As mentioned above, when the projecting portions 23a, 23b, 24a, 24b formed to protrude from the upper and lower end portions of the sheet metal columns 23, 24 are respectively fitted in the positioning angular holes 21a, 22a made in the locker base 21 and the top board 22, the sheet metal columns 23, 24 are positioned with respect to the locker base 21 and the top board 22, thus insuring the sufficient dimensional accuracy at every frame structure of the locker 20 creating various units. Accordingly, the cartridge 10 can certainly be inserted and extracted into/from the storage rack 13 or the deck through the use of the accessor 7.

In addition, the reference pins 21b, 22b set protrusively on the locker base 21 and the top board 22 can accurately position the X rail 8 and top rail 12 for guiding the accessor 7 with respect to the locker base 21 and top board 22 organizing the frame structure of the locker 20. More specifically, as shown in FIG. 5, owing to the dimension A between the reference pin 22b and the rectangular hole 22a and the dimension B between the reference pin 21b and the rectangular hole 21a, the top rail 12 and the X rail 8 are positioned with respect to the sheet metal columns 23, and further, due to the connection between the top board 22 and the locker base 21 through the sheet metal columns 23, the dimension between the X rail and the top rail 12 is accurately insurable. For this reason, it is possible to ensure the positional accuracy of the accessor 7, thereby enhancing the certainty of the insertion/extraction of the cartridge 10 in relation to the storage rack 13 and the deck.

In the locker 20 according to this embodiment, as shown in FIG. 6, the respective sheet metal columns 23, 24 disposed to be positioned between the top board 22 and the locker base 21 as described above are fixedly welded to the top board 22 and the locker base 21 from the inside of the locker 20. Although FIG. 6 shows only the welded sections 26 between the rear side sheet metal columns 24 and the locker base 21, the welding is made in a similar way between the front side sheet metal columns 23 and the locker base 21 and between the sheet metal columns 23, 24 and the top board 22 from the inside of the locker 20.

In the case of connecting the top board or the locker base with the respective columns by means of a welding technique, the welding has so far been done from the outside of the respective columns, i.e., from the outer surface sides of the respective columns, and therefore, the welding beads protrude outwardly to impair the smoothness of the outer surfaces of the locker frame structure, which causes the locker volume or the installation area increase to deteriorate the storage efficiency of the library apparatus not to meet the requirements for the size reduction of the library apparatus.

Contrary to this prior art, according to this embodiment, a look at FIG. 6 shows that, because of the welding from the inside of the locker 20, the projections of the welded sections (welding beads) 26 toward the exterior of the locker 20 are avoidable, thus smoothing the outer surfaces of the frame structure of the locker 20.

Accordingly, as shown in FIG. 7, side boards 27, 28 for covering the front and rear sides of the frame structure of the locker 20 are allowed to have a considerable thin thickness and the separation between the lockers 20 disposed to be adjacent to each other is reducible to lessen the dead spaces, and hence, the volume and installation area of the locker 20 are reducible to remarkably improve the storage efficiency and further to achieve the size reduction of the library apparatus 1, 1'.

Besides, because of employing the sheet metal columns 23, 24, the dimensional accuracy of the locker frame structure is improvable to allow the cartridge 10 to be surely inserted and extracted in relation to the storage rack 13 or the deck.

[3-2] Description of Arrangement of Locker

Furthermore, referring to FIGS. 8 to 17, a description will be made hereinbelow of an arrangement of each of the lockers 20 having the frame structure described above and further of an installation procedure of the locker 20. For the description, the locker 20 constituting the CSU4 will be taken as one example.

Figure 8:
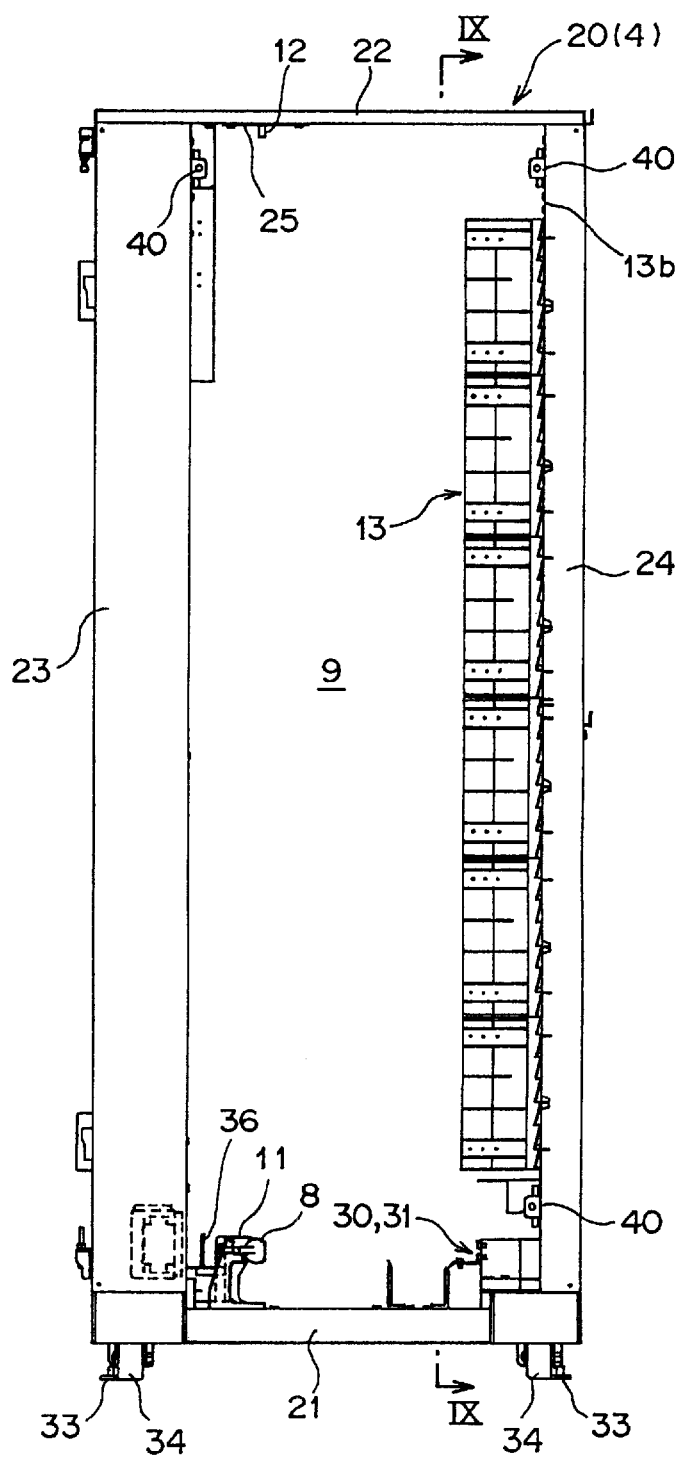
FIG. 8 is a side elevational view showing a locker (CSU) in this embodiment.
Figure 9:
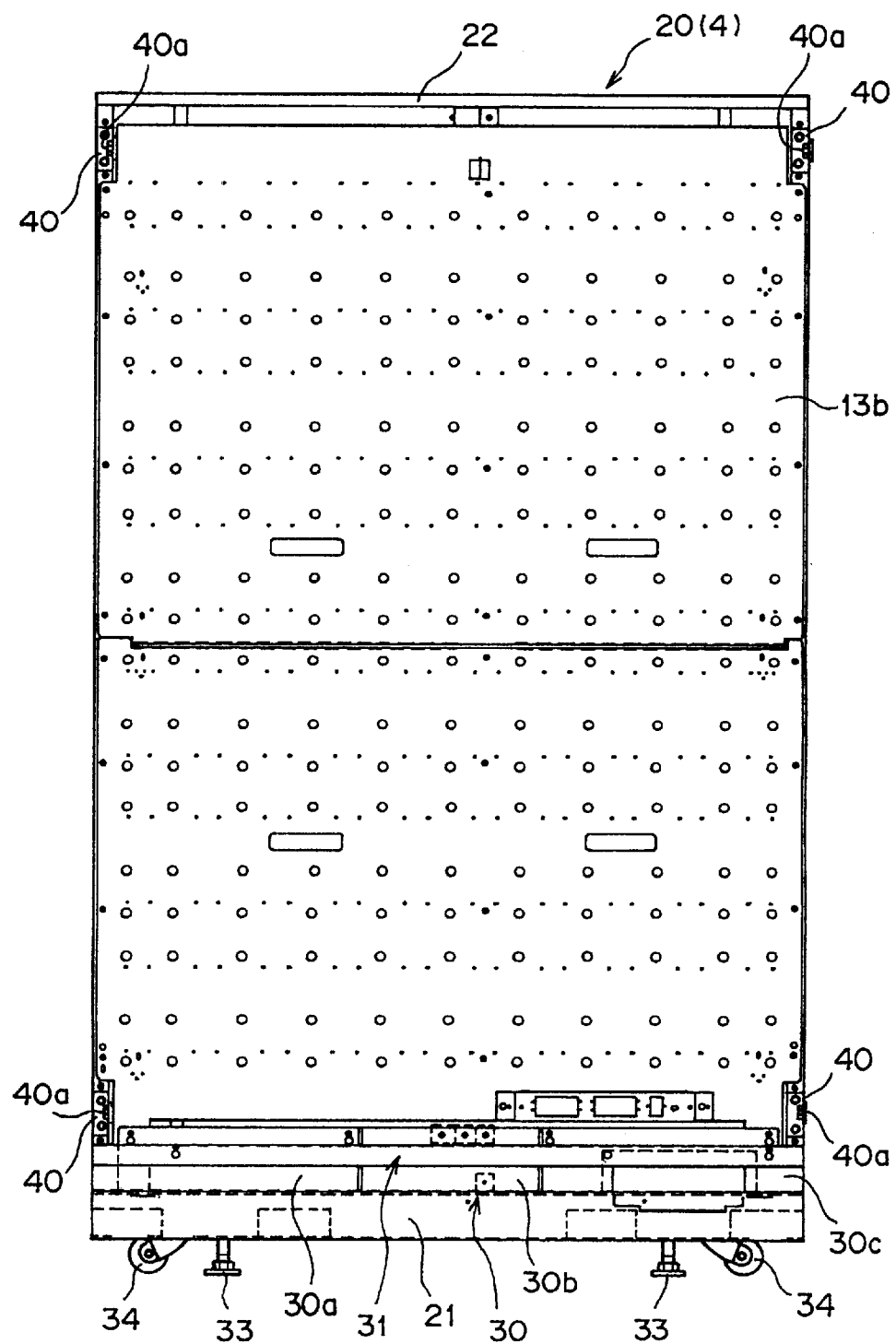
FIG. 9 is an illustration taken along a line IX—IX of FIG. 8.

FIG. 8 is a side elevational view showing the locker 20 constituting the CSU4 according to this embodiment and FIG. 9 is an illustration taken along a line IX—IX of FIG. 8. As shown in FIGS. 8 and 9, the storage rack 13 having a large number of cells 13a are set onto a rear side (the right side in FIG. 8) wall surface of the locker 20 organizing the CSU 4. In FIG. 9, the storage rack 13 is omitted from the illustration.

Furthermore, at a lower section of the rear side of the locker 20, there are situated a cable duct 30 for accommodating and guiding various kinds of cables (not shown) for the wiring within the library apparatus 1, 1' and a duct cover 31 for covering the entire cable duct 30 from the above.

Figure 10:
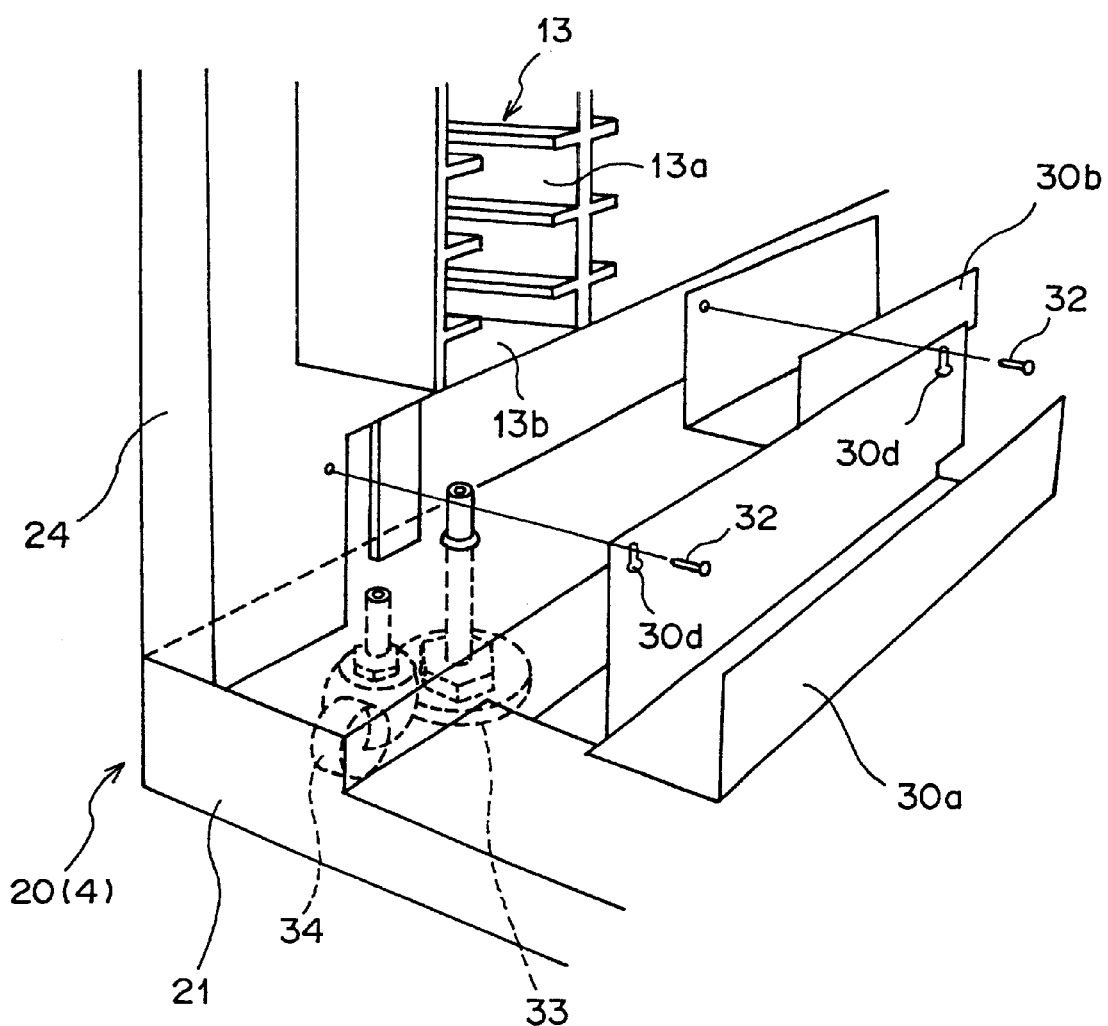
FIG. 10 is an exploded perspective view showing a principal portion of the locker (CSU) for describing a cable duct structure in this embodiment.

In this embodiment, as shown in FIGS. 8 and 10, the cable duct 30 is divided into three sections (end sections 30a, 30c and a central section 30b) along the coupling directions (left and right directions in FIG. 9) of the lockers 20. Further, a central section (fixed cable duct) 30b of the three divisions of the cable duct 30 is fixed to the locker 20, whereas both the end sections (detachable cable ducts) 30a, 30c are detachably attached to the locker 20 as shown in FIG. 10.

FIG. 10 is an exploded perspective view showing a principal portion of the locker 20 (CSU4) for explaining a structure of the cable duct in this embodiment.

As shown in FIG. 10, the detachable cable duct 30a is fixedly fitted to the body of the locker 20 and an end portion of the fixed cable duct 30b through fitting screws 32, 32 penetrating holes 30d, 30d made in its both end portions. The detachable cable duct 30c is also fitted to the locker 20 as well as the detachable cable duct 30a.

Furthermore, by detaching the detachable cable ducts 30a, 30c, base legs 33 set to the rear side lower surface of the locker 20 and top portions of casters 34 appear.

The casters 34 are used in moving the locker 20, and the base legs 33 are placed into contact with the installation surface of the locker 20 for adjusting the inclination of the locker 20. In a manner of rotating the base legs 33 themselves, the base legs 33 extend and contract with respect to the locker 20 to adjust the height of the rear side section of the locker 20.

Figure 11A:
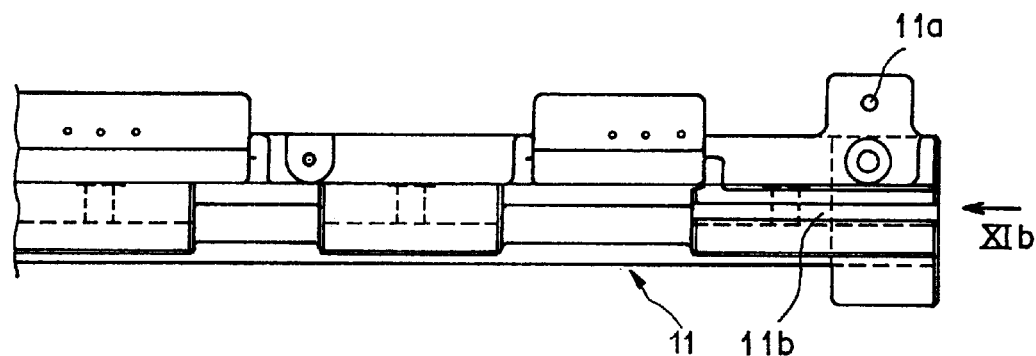
FIGS. 11A and 11B are respectively a plan view and a side elevational view (an illustration of a portion indicated by an arrow XIb of FIG. 11A) each showing an end portion of a rack support (a supporting member) in this embodiment.
Figure 11B:
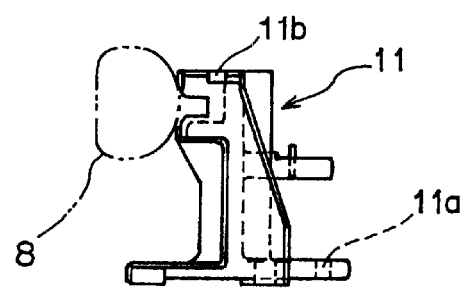

Still further, the rack support 11 for bearing the X rail 8 is placed on the front side (left side in FIG. 8) lower section of the locker 20 in the locker coupling directions as shown in FIGS. 1, 2, 5 and 8. In addition, positioning grooves 11b each accepting a bar-like tool 35 (see FIG. 12) at the positioning relative to the adjacent locker 20 are formed in both end portions of the rack support 11 in the locker coupling directions as shown in FIGS. 11A and 11B. FIGS. 11A and 11B are respectively plan and side elevational views showing the end portion of the rack support 11 in this embodiment. FIG. 11B corresponding to an illustration of a portion indicated by an arrow XIb of FIG. 11A.

Furthermore, as shown in FIG. 8, in the vicinity of the rack support 11, a position flag (flag member) 36 is located which is used when the accessor 7 recognizes the position a t operation.

Figure 16A:
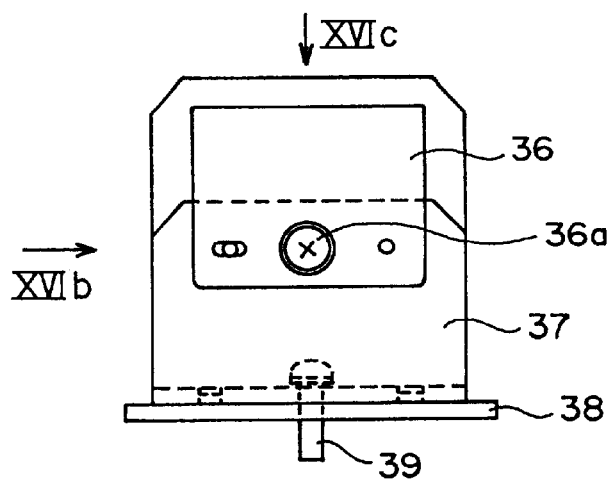
FIGS. 16A to 16C are respectively a front elevational view, a side elevational view (an illustration of a portion indicated by an arrow XVIb in FIG. 16A) and a plan view (an illustration of a portion pointed out by an arrow XVIc in FIG. 16A) each showing a position flag and its fitting structure in this embodiment.
Figure 16B:
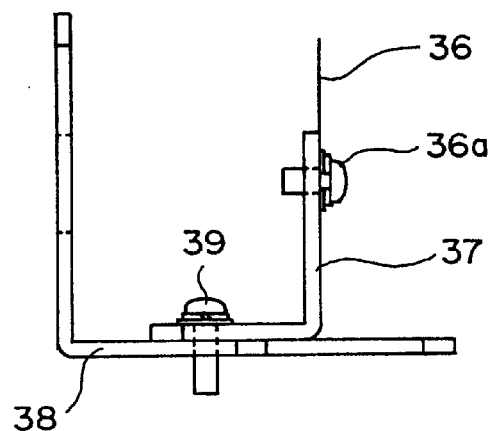
Figure 16C:
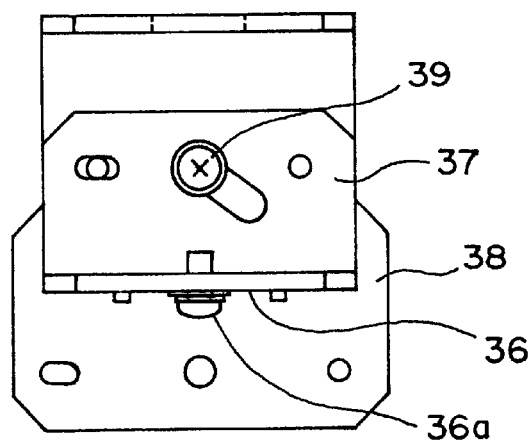

As shown in FIGS. 16A to 16C, this position flag 36 is previously fixedly fitted to a flag fitting member 37 through a fitting screw 36a, and in this embodiment, the flag fitting member 37 is attached through a seating 38 at a given position near the rack support 11 through the use of a fitting screw 39 screwed in downwardly from a vertical direction. FIGS. 16A to 16C are respectively a front elevational view, a side elevational view and a plan view showing the position flag 36 and its fitting structure in this embodiment, and FIG. 16B corresponds to an illustration of a portion indicated by an arrow XVIb in FIG. 16A, while FIG. 16C corresponds to an illustration of a portion indicated by an arrow XVIc in FIG. 16A.

Still further, as shown in FIGS. 8 and 9, tie plates 40 for fixedly coupling this locker 20 to the locker located to be adjacent thereto are fitted at the upper and lower portions of the rear side sheet metal columns 24, 24 of the locker 20 and the upper portions of the front side sheet metal columns 23, 23, i.e., at six portions in total.

Figure 17A:
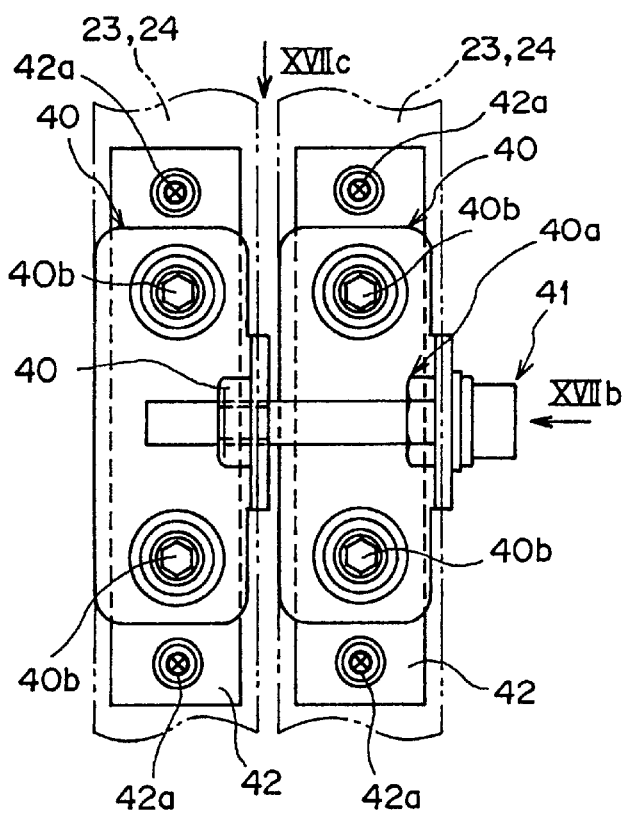
FIGS. 17A to 17C are respectively a front elevational view, a side elevational view (an illustration of a portion indicated by an arrow XVIIb in FIG. 17A) and a plan view (an illustration of a portion pointed out by an arrow XVIIc in FIG. 17A) each showing a tie plate and its connecting condition in this embodiment.
Figure 17B:
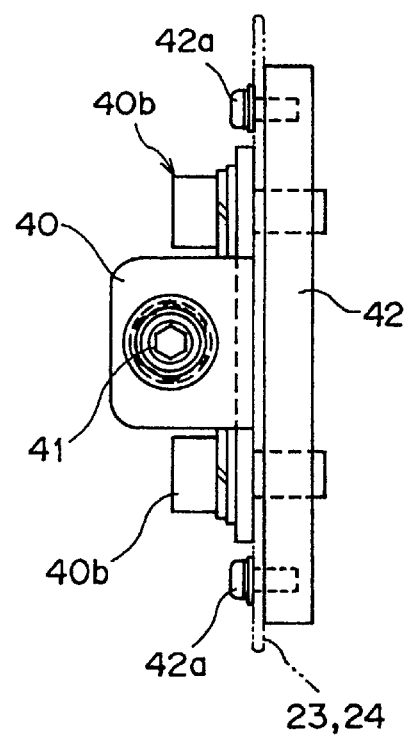
Figure 17C:
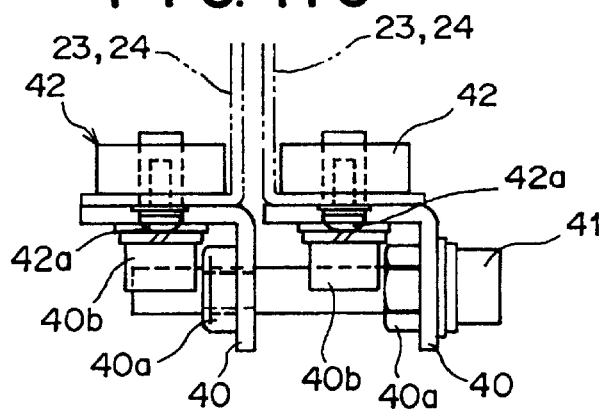

As shown in FIGS. 17A to 17C, each of the tie plates 40 is fitted through a pair of upper and lower fitting bolts 40b in a state where the sheet metal column 23 or 24 is interposed between the tie plate 40 and a plate nut 42. That is, the plate nut 42 is fitted to the inner circumferential surface side of the sheet metal column 23 or 24 through a fixing screw 42a, and the tie plate 40 located on the outer circumferential surface side of the sheet metal column 23 or 24 is fixed by being tightened by the fitting bolts 40b with respect to the plate nut 42. Besides, the tie plates 40 and the sheet metal columns 23, 24 have a hole (not shown) through which each of the fitting bolts 40b passes.

A fixed nut 40a is fitted to each of the tie plates 40. In a state where the lockers 20, 20 to be coupled to each other are disposed to be adjacent to each other, the tie plates 40 of the respective lockers 20 are brought close to each other, and the fixing bolts 41 are inserted and tightened with respect to the fixed nuts 40a, 40a of the adjacent tie plates 40, 40, thus accomplishing the connection between the lockers 20, 20 in a fixing way.

FIGS. 17A to 17C are respectively a front elevational view, a side elevational view and a plan view showing the tie plates 40 and the connected condition thereof, and FIG. 17B corresponds to an illustration of a portion indicated by an arrow XVIIb in FIG. 17A while FIG. 17C corresponds to an illustration of a portion indicated by an arrow XVIIc in FIG. 17A.

Moreover, as shown in FIG. 13, plane reference plates 43 are fitted through pairs of upper and lower fitting bolts 43c, 43c to the front side sheet metal columns 23 of the locker 20, and each is composed of a vertical surface 43a parallel to the locker coupling directions and an edge surface 43b perpendicular to the locker coupling directions. The vertical surface- 43a of each of the plane reference plates 43 is used as a reference surface at the positioning with respect to the adjacent locker 20 as will be described herein later with reference to FIGS. 14A and 14B.

Furthermore, in this embodiment, as shown in FIG. 13, the top rail 12 is attached through the bearing plate 25 to the lower surface of the top board 22 while being positioned with the reference pins 22b. FIG. 13 is a perspective view showing a connecting section of the locker 20, looked up from the internal side, for describing the plane reference plates 43 and the connected section of the top rail 12. In FIG. 13, the tie plates 40 are omitted from the illustration.

As shown in FIG. 13, a projecting portion 12a is formed on one end side of the top rail 12 while a recess portion 12b is formed on the other end side of the top rail 12, and for the connection between the top rails 12, 12 of the lockers 20, 20 disposed to be adjacent to each other, these projecting portions 12a are fitted in the recess portions 12b.

In addition, the bearing plate 25 has elongated holes 25a made along the locker coupling directions, and by tightening fitting screws 25b penetrating the elongated holes 25a, the bearing plate 25 is fixed to the lower surface of the top board 22. Further, in a state where the fitting screws 25b are inserted into the elongated holes 25a and the bearing plate 25 is temporarily fitted to the lower surface of the top board 22, the bearing plate 25 is made to be slidable in the locker coupling directions by a quantity corresponding to the pitch of the projecting portion 12a and the recess portion 12b of the top rail 12.

[3-3] Description of Locker Installation Procedure

Moreover, referring to the respective figures, a description will be made hereinbelow of a work procedure involving items (1) to (13) taken for when installing and coupling the various units 2A, 2B and 3 to 6 each being constructed with the above-described lockers 20.

For the installation of the lockers 20, for instance, the separation between the adjacent lockers 20, 20 in the X direction is set to be 4 mm. This separation depends upon the pitch of the rack (gear) formed on the X rail 8. Further, the alignment between the adjacent lockers 20, 20 in the Y and Z directions is basically conducted by the alignment between the center positions of the X rails 8.

(1) In order to arrange a plurality of lockers 20 straightforwardly, a reference line is first drawn on the installation surface (floor surface) for the library apparatus 1 or 1'.

(2) In this embodiment, the locker 20 constituting the TMU 5 is taken as a reference locker and this locker 20 for the TMU 5 is installed at a given position. At this time, as shown in FIG. 10, the detachable cable ducts 30a, 30c are removed to make the base legs 33 appear, and the base legs 33 are rotationally operated to come into contact with the installation surface and further to adjust the heights (the degrees of extension) of the base legs 33 so that the locker base 21 of the TMU 5 (i.e., the X-Z plane of the TMU 5) is adjusted to assume the horizontal condition.

(3) The lockers 20 (the CSU4 in the case of the library apparatus 1' shown in FIG. 2) to be coupled to both sides of the TMU 5 are situated on both the sides of the TMU 5, and in this state, the positional adjustment and the adjustment of the deflection of the X rail 8 (the inclination of the lockers 20) are made as follows.

(3-1) For the disposition of the locker 20 to be coupled to the TMU 5, the position thereof in the X direction is adjusted so that the separations between the front side sheet metal columns 23 thereof and the front side sheet metal columns 23 of the TMU 5 take 4 mm.

Figure 12:
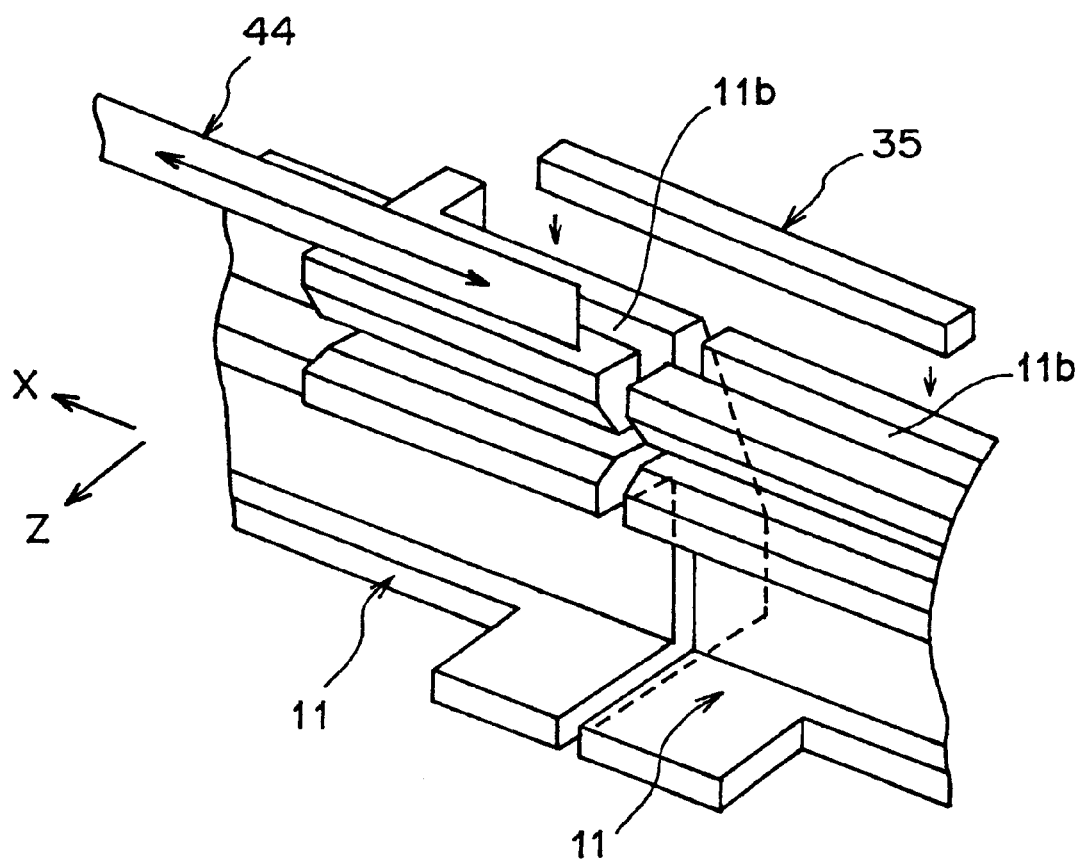
FIG. 12 is a perspective view showing the end portions of the rack supports disposed to be adjacent to each other for explaining an inter-locker positioning way based upon the rack supports.

(3-2) As shown in FIG. 12, through the use of a scale (a linear member such as a metallic scale) 44 or a level (not shown), the position of the locker 20 to be coupled in the Y direction is adjusted by the adjustment of the heights (extension degrees) of the base legs 33 so that the upper surface of the rack support 11 of the TMU 5 and the upper surface of the rack support 11 of the locker 20 to be coupled are in the same plane. This positional adjustment in the Y direction makes the position of the locker 20 to be coupled additionally adjustable so that the X-Z plane (the plane perpendicular to the Y direction) of the locker 20 takes the horizontal condition.

(3-3) As shown in FIG. 12, the locker 20 to be coupled is shifted such that the bar-like tool 35 is mounted on both the positioning grooves 11b, 11b of the rack supports 11, 11 to be fitted therein, which accomplishes the adjustment of the rack supports 11, 11 in the Z direction concurrently with performing the adjustment of the locker 20 to be coupled so that the Y-Z plane (the planes normal to the X direction ) of the locker 20 gets into a parallel relation to the Y-Z plane of the TMU 5. FIG. 12 is a perspective view showing end portions of the rack supports 11, 11 disposed to be adjacent to each other for explaining a method of positioning between the lockers 20, 20 based upon the rack supports 11, 11.

Figure 14A:
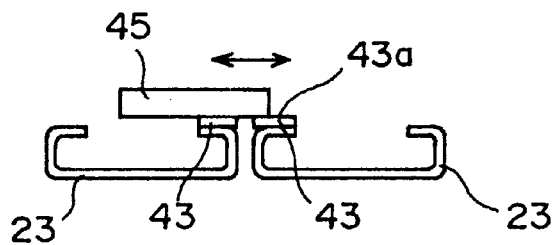
FIGS. 14A and 14B are illustrations useful for describing a positioning way based upon the plane reference plate.
Figure 14B:
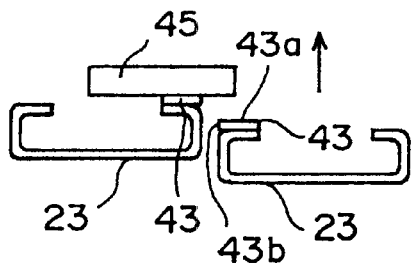

(3-4) As shown in FIGS. 14A and 14B, the scale (a linear member such as a metallic scale) 45 is placed to be mounted on both the plane reference plates 43, 43 fitted to the front side sheet metal columns 23, 23 and further to be brought into contact with the vertical surfaces 43a, 43a thereof, and is moved to slide thereon for adjusting the heights (the extension degrees) of the base legs 33 so that these vertical surfaces 43a, 43a are in the same plane. Whereupon, the position of the locker 20 to be coupled is adjustable so that the X-Y plane (the planes perpendicular to the Z direction) of the locker 20 becomes parallel to the X-Y plane of the TMU 5.

Figure 15:
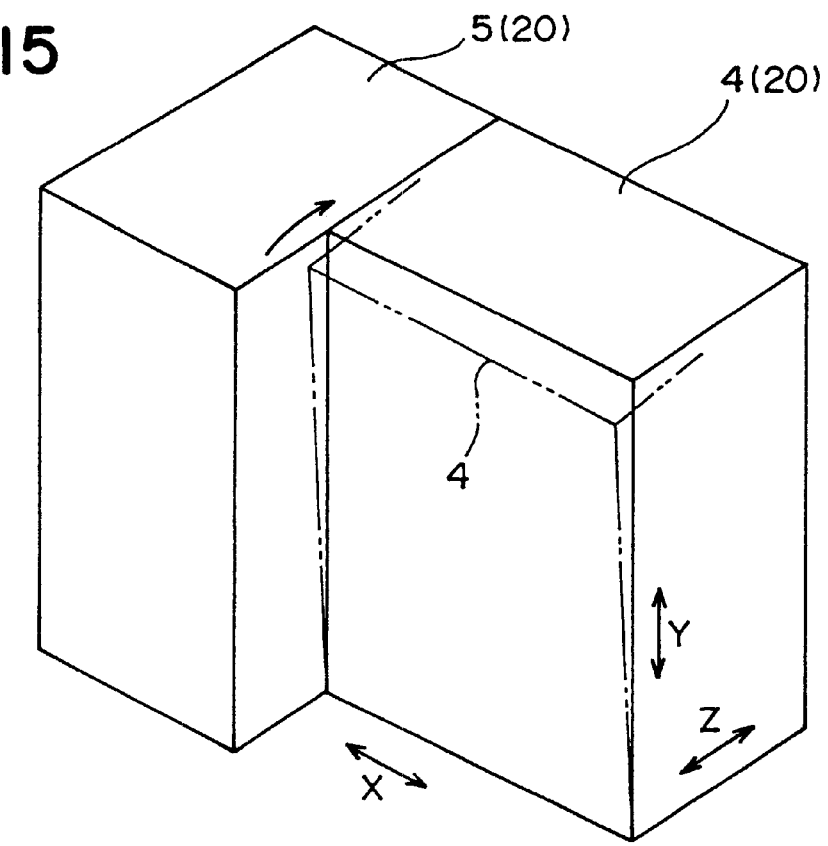
FIG. 15 is a perspective view illustratively showing a locker for describing a method of adjusting the verticality of a locker in this embodiment.

For instance, in case where the X-Y plane of the locker 20 (CSU4) to be coupled is inclined with respect to the X-Y plane of the TMU 5 as shown in FIG. 14B or 15, with the above 10 described adjustment whereby the vertical surfaces 43a, 43a of the plane reference plates 43, 43 are in the same plane as shown in FIG. 14A, the inclination is eliminable.

At this time, if the adjustment is made through the use of the surface(s) of the sheet metal column(s) 23 without fitting the plane reference plates 43, the scale 45 runs on the bending-formed corner portions of the sheet metal column 23 at the sliding movements, with the result that difficulty is encountered to finely adjust the position of the locker 20 to be coupled.

In this embodiment, owing to the fitting of the plane reference plate 43 having the edge surface 43b, even if the X-Y plane of the locker 20 to be coupled is in a slightly inclined condition with respect to the X-Y plane of the TMU 5, the end surface of the scale 45 comes into contact with the edge surface 43b to allow the detection of that inclination, and therefore, the fine adjustment of the position of the locker 20 to be coupled becomes easily feasible.

FIGS. 14A and 14B are illustrations useful for describing a positioning way based upon the plane reference plate 43 in this embodiment, while FIG. 15 is a perspective view illustratively showing the lockers 20 for explaining a method of adjusting the verticality of the lockers according to this embodiment.

(4) After the completion of the above-described positional adjustment and inclination adjustment of the locker 20, the X rail 8 having a length substantially equal to that of the locker 20 in the X direction is disposed to be mounted on both the rack supports 11, 11 of the TMU 5 and the locker 20 to be coupled in a state of being shifted by ⅓ of a pitch with respect to the locker 20 to be set to these rack supports 11, 11, thereby accomplishing the connection between the rack supports 11, 11.

(5) As shown in FIG. 13, after the fitting screws 25b of the bearing plate 25 in the locker 20 under the coupling are loosened, the bearing plate 25 is moved to slide along the elongated holes 25a so that the projecting portion 12a of the top rail 12 of the TMU 5 engages with the recess portion 12b of the top rail of the locker 20 under the coupling, thus establishing the connection between these top rails 12, 12. Thereafter, the fitting screws 25b are retightened to fix the bearing plate 25, i.e., the top rail 12.

(6) The procedure involving the above-described items (3) to (5) is repeatedly done to successively make the connections between the adjacent lockers 20.

(7) After all the lockers 20 are disposed and coupled to each other through the X rails 8 in accordance with the above-described procedure, as shown in FIGS. 17A to 17C, the tie plates 40, 40 are connected to each other through the fixing bolt 41 by tightening the fixing bolt 41, thus achieving the connection and fixing among all the lockers 20.

(8) The detachable cable ducts 30a, 30c of each of all the lockers 20 are again set in place and, then, fixedly fitted by the fitting screws 32.

(9) The cables (not shown) are housed within the cable duct 30 and the cable forming is done.

(10) As shown in FIG. 9, the duct cover 31 is set to the cable duct 30.

(11) The position flag 36 is fitted through the flag fitting member 37 and the seating 38 at a given position (see FIG. 8) near the rack support 11 by the fitting screw 39 set vertically and downwardly from the above.

(12) The accessor 7, the mechanism (not shown) associated with the accessor 7, an X cable (not shown) connected to the accessor 7, and others are located within the locker 20.

(13) External cables of the library apparatus 1 or 1' are put into connections.

As described above, in the library apparatus 1, 1 ', in making the connection between the adjacent lockers 20, 20, the bar-like tool 35 is mounted on both the positioning grooves 11b, 11bof the rack supports 11, 11 to be fitted therein in a state where the rack supports 11, 11 are placed in an opposed relation to each other, so that the rack supports 11, 11 are positioned in terms of the direction (Y-Z plane) perpendicular to the locker coupling direction (X direction ), with the result that not only the connection accuracy and positioning accuracy among a plurality of lockers 20 are insurable, but also the linearity of the rails is achievable.

Furthermore, in making the connection between the adjacent lockers 20, 20, the verticality of the lockers 20 relative to the installation surface is adjusted while the scale 45 is mounted on both the plane reference plates 43, 43 on the two adjacent sheet metal columns 23, 23 and brought into contact therewith in a state where the two lockers 20, 20 are disposed to be adjacent to each other, so that these two lockers 20, 20 can stand at the same verticality, thus ensuring the connection accuracy and positioning accuracy among a plurality of lockers 20.

Accordingly, this makes it possible for the accessor 7 to surely carry out the insertion/extraction of the cartridge 10 into/from the storage rack 13 or the deck.

Moreover, in a manner that the fitting screw 32 is vertically inserted from the above, the position flag 26 can easily be set in a narrow portion near the rack support 11, and in a way of removing the detachable cable ducts 30a, 30c, the base legs 33 and others located under the cable duct 30 are easily adjustable, which sharply enhance the installation work efficiency of the lockers 20.

[3-4] Description of AEU

The library apparatus 1' is, as shown in FIG. 2A, provided with an AEU 6. As shown in FIG. 18, this AEU 6 includes a power supply 16 for supplying an operating power to the accessor 7 and a controller 17 for taking the charge of the control of the accessor 7.

The locker 20 for the AEU 6 has a passage section 20a constituting a passage (accessor operating area) 9 in which the accessor 7 travels, and a gate 47 fitted through hinges 46 to the passage section 20a to be rotatable by 90 degrees. Further, the power supply 16 is placed at a lower section of the gate 47 while two shelves 48 are provided at an upper section of the gate 47. Each of the shelves 48 accepts a plurality of control printed-circuit boards 49 organizing the controller 17.

Figure 18:
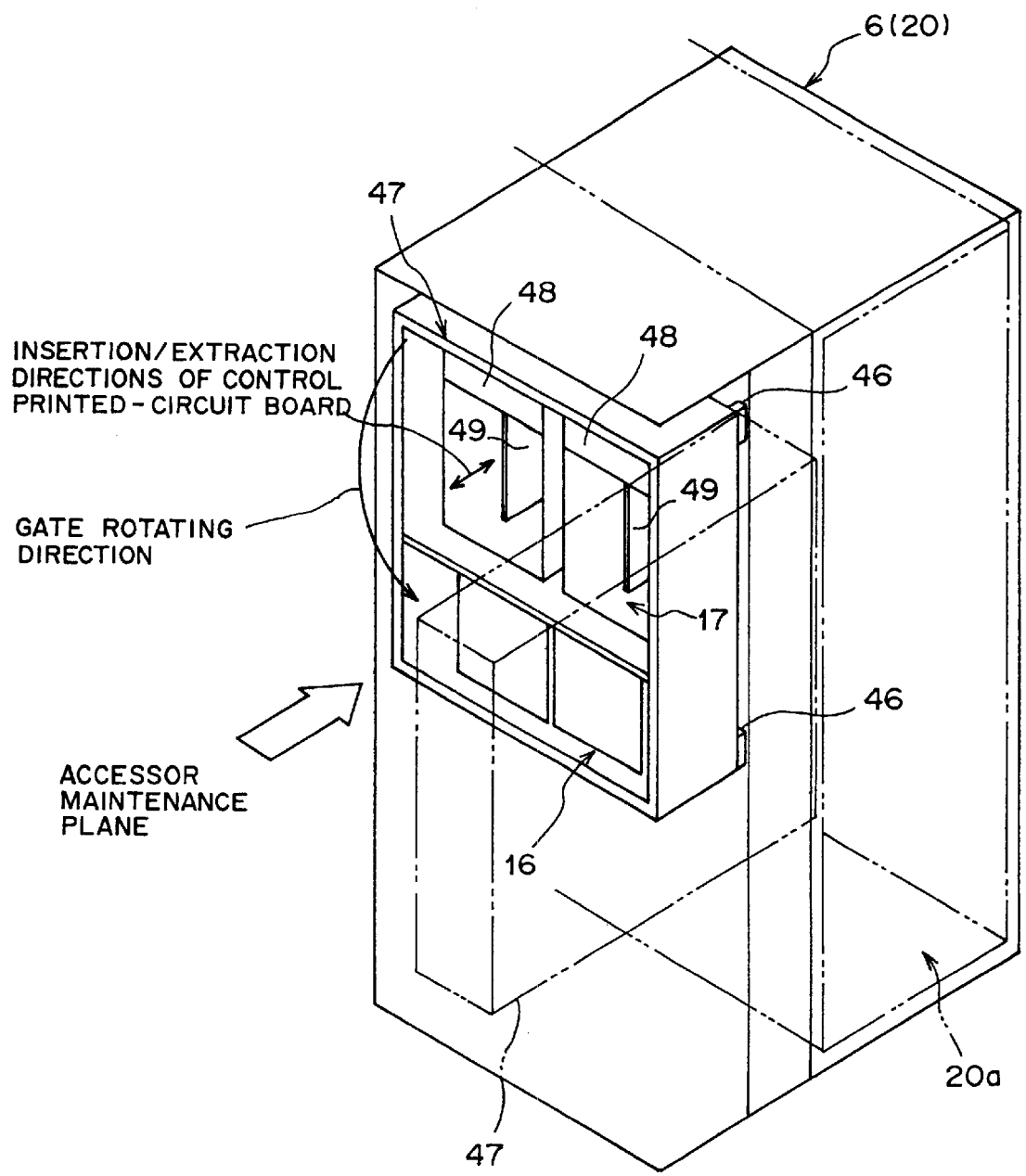
FIG. 18 is a perspective view illustratively showing a locker (AEU) having a shelf in this embodiment.

The maintenance and replacement of the power supply 16 and the control printed-circuit boards 49 are done in a state indicated by a solid line in FIG. 18 without the need for opening the gate 47. Further, in the case of performing the maintenance of the accessor 7 waiting within the passage section 20a (passage 9) of the AEU6, or in the case of replacing a back panel 50 (see FIG. 19A) accommodating the control printed-circuit boards 49, the gate 47 is rotated by 90 degrees to open, as indicated by a two-dot chain line in FIG. 18.

Figure 19A:
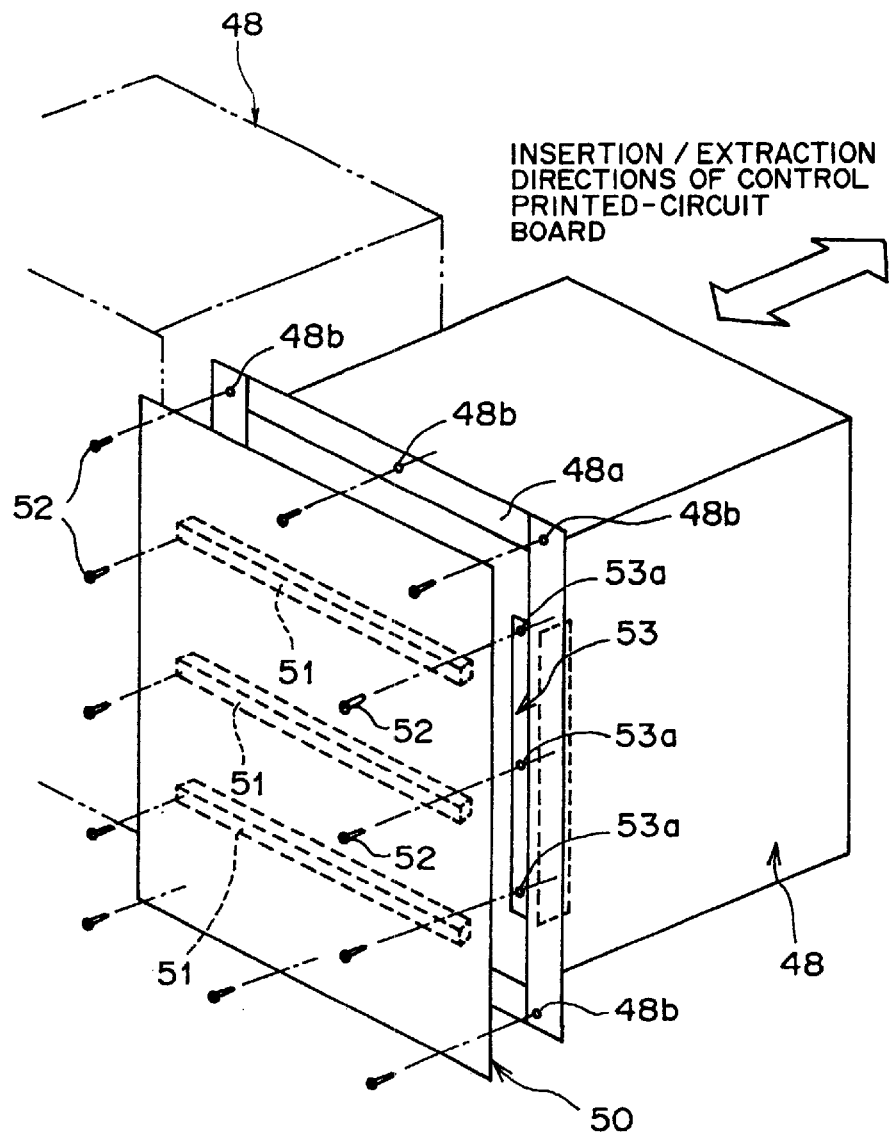
FIGS. 19A and 19B are an exploded perspective view showing a fitting structure of a shelf for a back panel and a cross-sectional view showing a principal portion for explaining a fitting condition of the back panel, respectively.

As shown in FIG. 19A, the back panel 50 is attached to the rear surface of each of the shelves 48. In a prior art, the back panel 50 has been attached thereto by fixing screws or the like not only in a direction perpendicular to the surface of the back panel 50 but also in a direction (a direction normal to the side surface of the shelf 48) parallel to that surface. However, the gate 47 is limited in its width and depth, and if two shelves 48 are disposed in line on the gate 47 as shown in FIG. 18, in the case of the prior fitting structure of the back panel 50, the maintenance and replacement of the back panel 50 become extremely difficult.

For this reason, in this embodiment, the inserting direction of fixing screws 52 for attaching the back panel 50 to the shelf 48 is limited only to directions perpendicular to the back panel 50.

More specifically, as shown in FIG. 19A, the fixing screws 52 to be set along the vertical directions of the back panel 5 0 penetrate the back panel 50 and, then, are engaged with taps 48b of a flange section 48a formed on the rear surface side of the shelf 48, thereby fixedly securing the back panel 50 to the shelf 48.

Figure 19B:
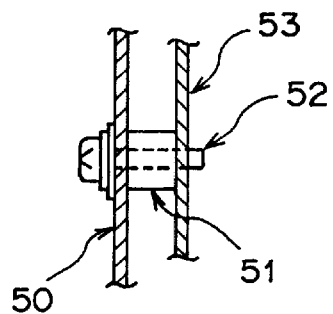

Furthermore, as shown in FIGS. 19A and 19B, a plurality of (3 in the illustration) reinforcing guide bars 51 are transversely fitted to the back panel 50, and the fixing screws 52 to be set along the left and right directions of the back panel 40 penetrate the back panel 50 and end portions of the reinforcing guide bars 51 and are engaged with taps 53a of fixed nut plates 53 fitted to the inner side of the rear wall of the shelf 48, thereby fixedly securing the back panel 50 to the shelf 48.

FIG. 18 is a perspective view illustratively showing the AEU 6 (locker 20) having the shelves 48 in this embodiment, and FIGS. 19A and 19B are respectively an exploded perspective view showing the fitting structure for the back panel 50 on the shelf 48 in this embodiment and is a cross-sectional view of a principal portion showing the fitting condition of the back panel 50.

As described above, in the AEU 6 of the library apparatus 1' according to this embodiment, since only one direction (a direction perpendicular to the back panel 50) is taken as the inserting direction of the fixing screw 52 for the attachment of the back panel 50, the attaching/detaching work of the back panels 50 becomes easy, with the result that the work efficiency can remarkably improve when carrying out the maintenance and replacement of the back panel 50 to each of the shelves 48.

[4] Description of Reference Flag and Diagnostic Cell

Referring to FIGS. 20 to 26, a description will be made hereinbelow of a reference flag and a diagnostic cell placed in the LAU 2A in this embodiment. Although the same reference flag and diagnostic cell are also provided in the RAU 2B and the AEU 6, the description here will be taken of only the LAU 2A.

Figure 20:
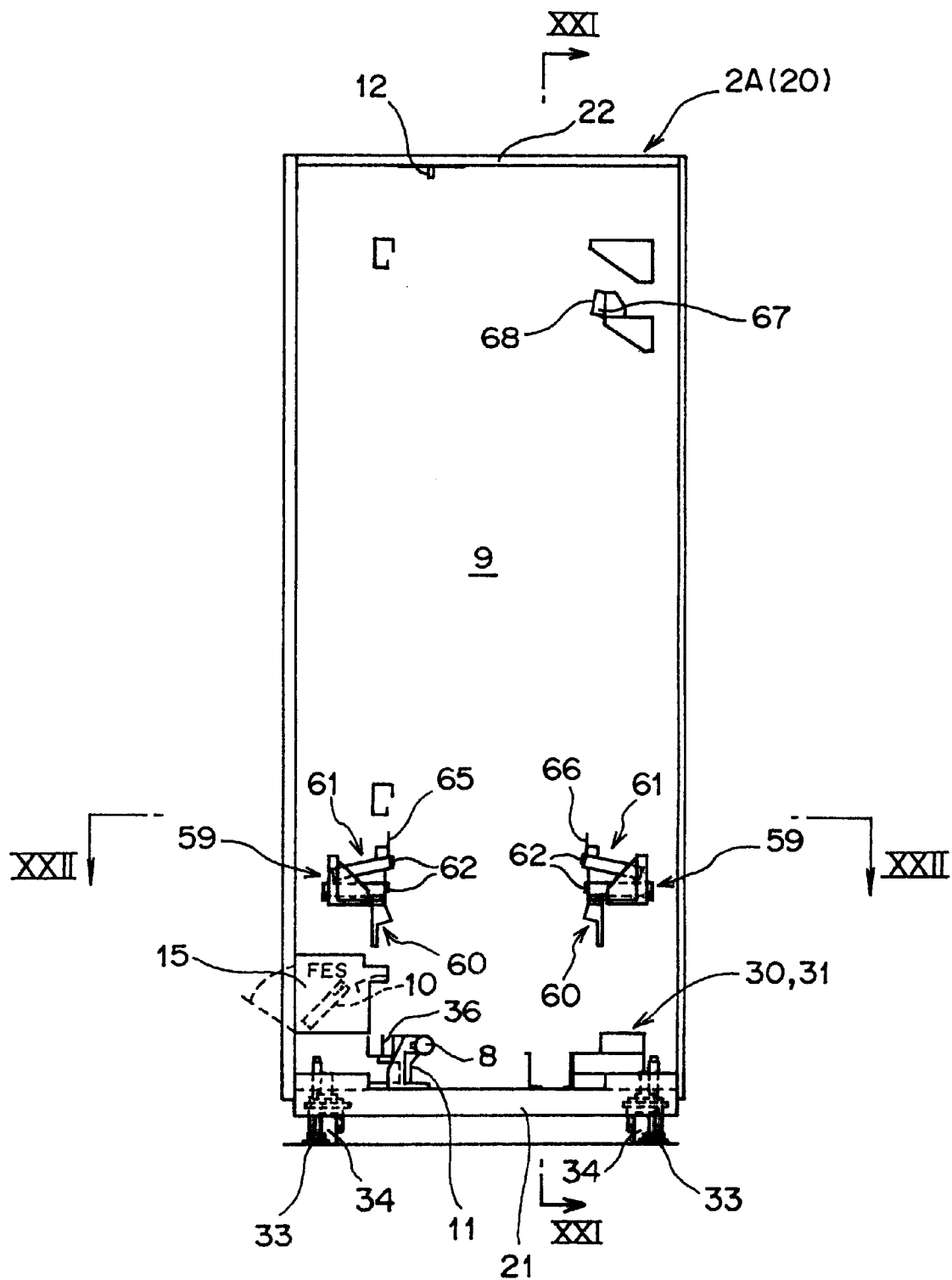
FIG. 20 is a side elevational view showing a locker (LAU) equipped with a reference flag and a diagnostic cell in this embodiment.
Figure 21:
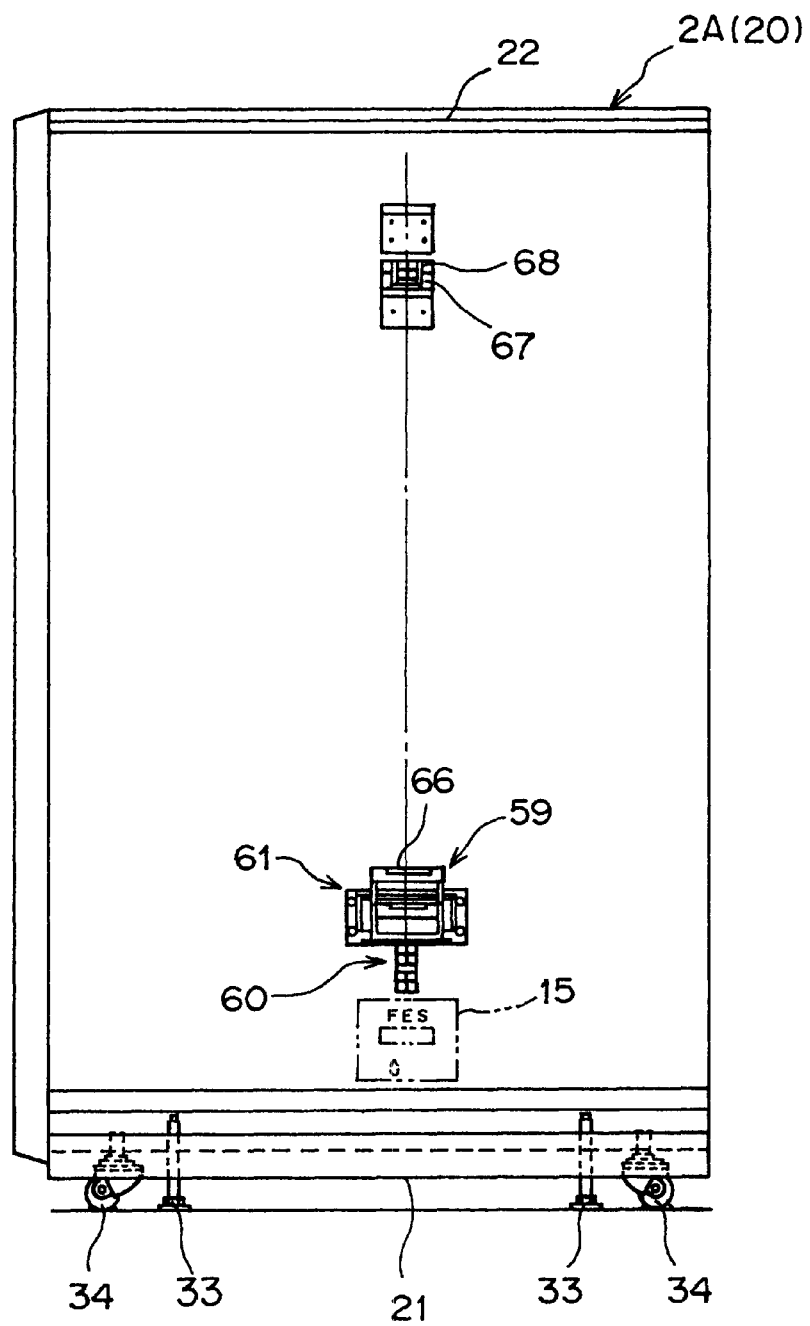
FIG. 21 is a front elevational view (an illustration taken along a line XXI—XXI of FIG. 20) showing the locker (LAU) including the reference flag and the diagnostic cell in this embodiment.
Figure 22:
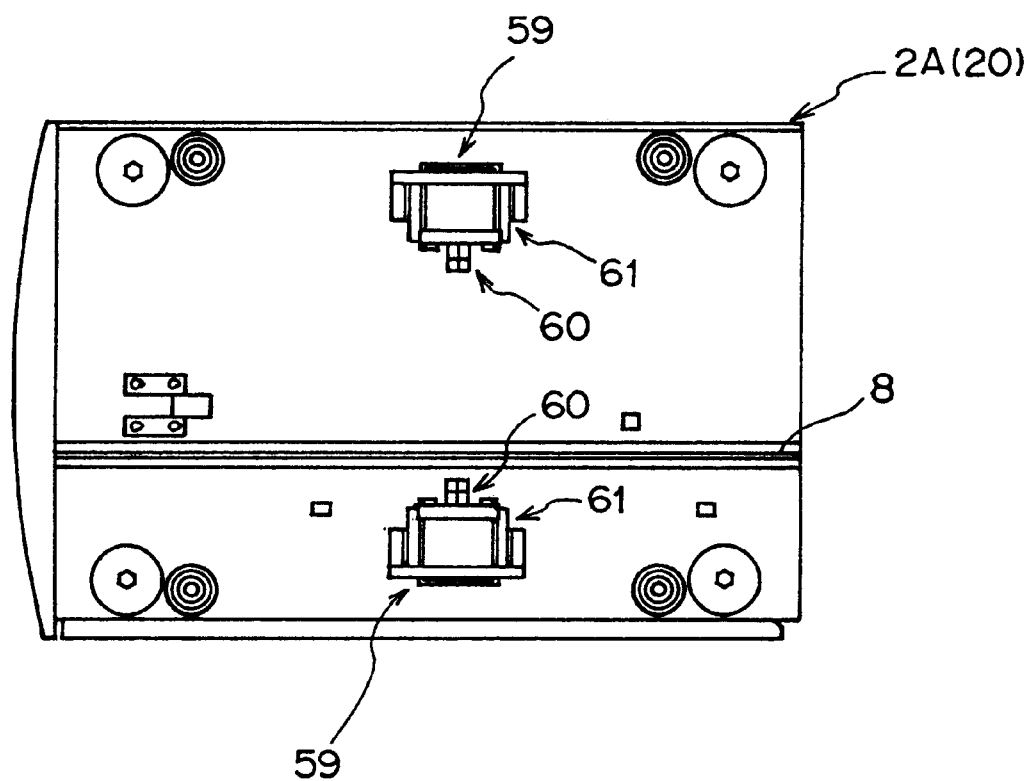
FIG. 22 is a plan view (an illustration taken along a line XXII—XXII of FIG. 20) showing the interior of the locker (LAU) including the reference flag and the diagnostic cell in this embodiment.
Figure 23:
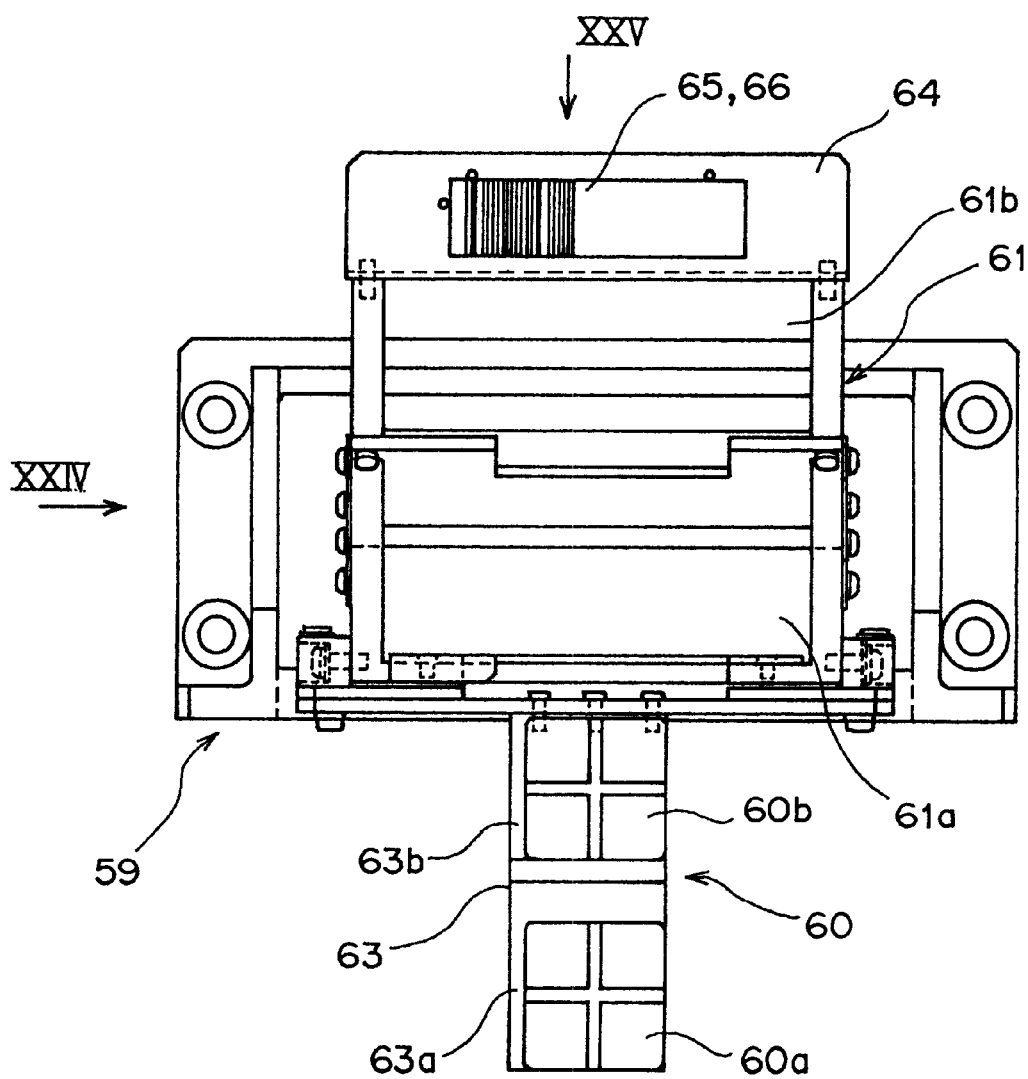
FIG. 23 is a front elevational view showing the reference flag and the diagnostic cell in this embodiment.
Figure 24:
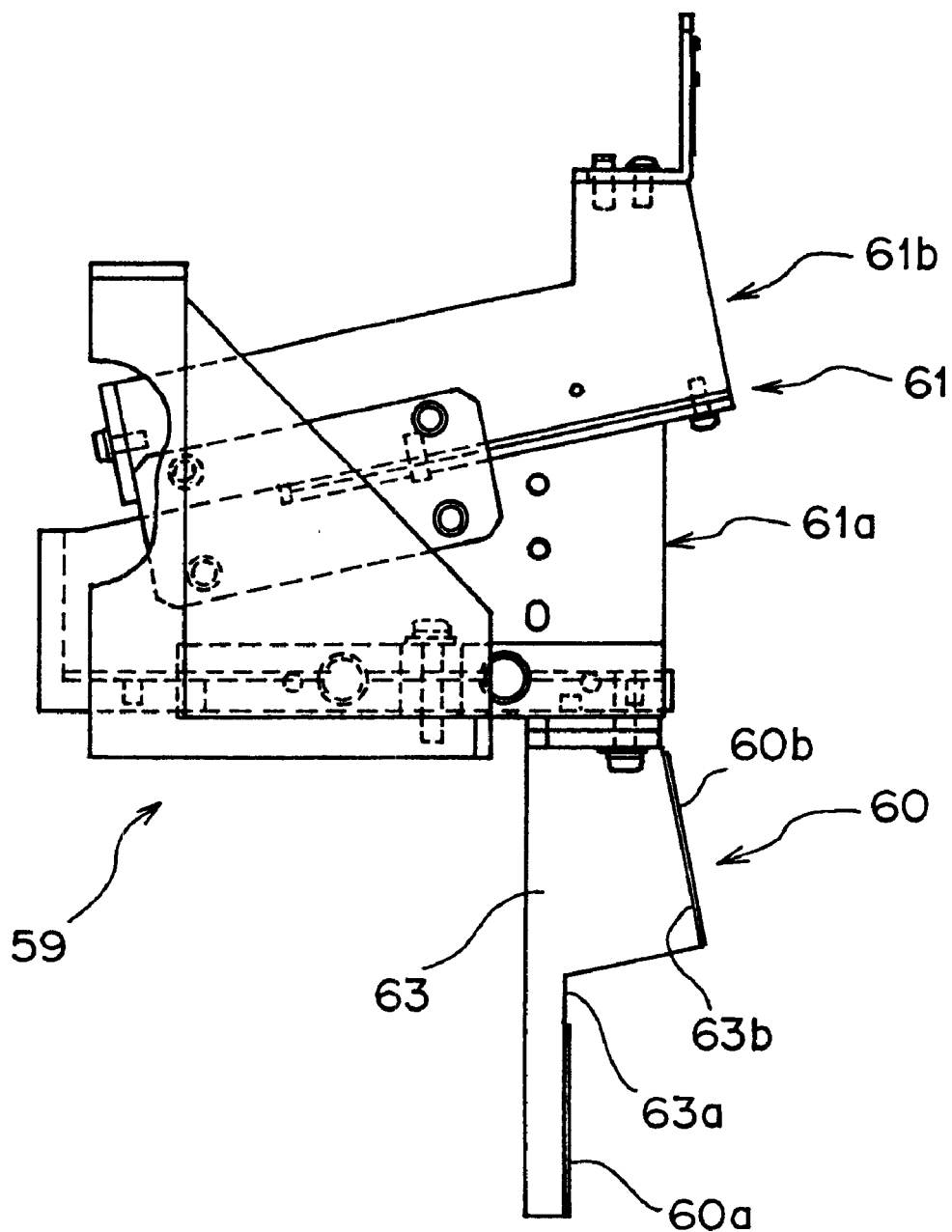
FIG. 24 is an illustration of a portion indicated with an arrow XXIV in FIG. 23.
Figure 25:
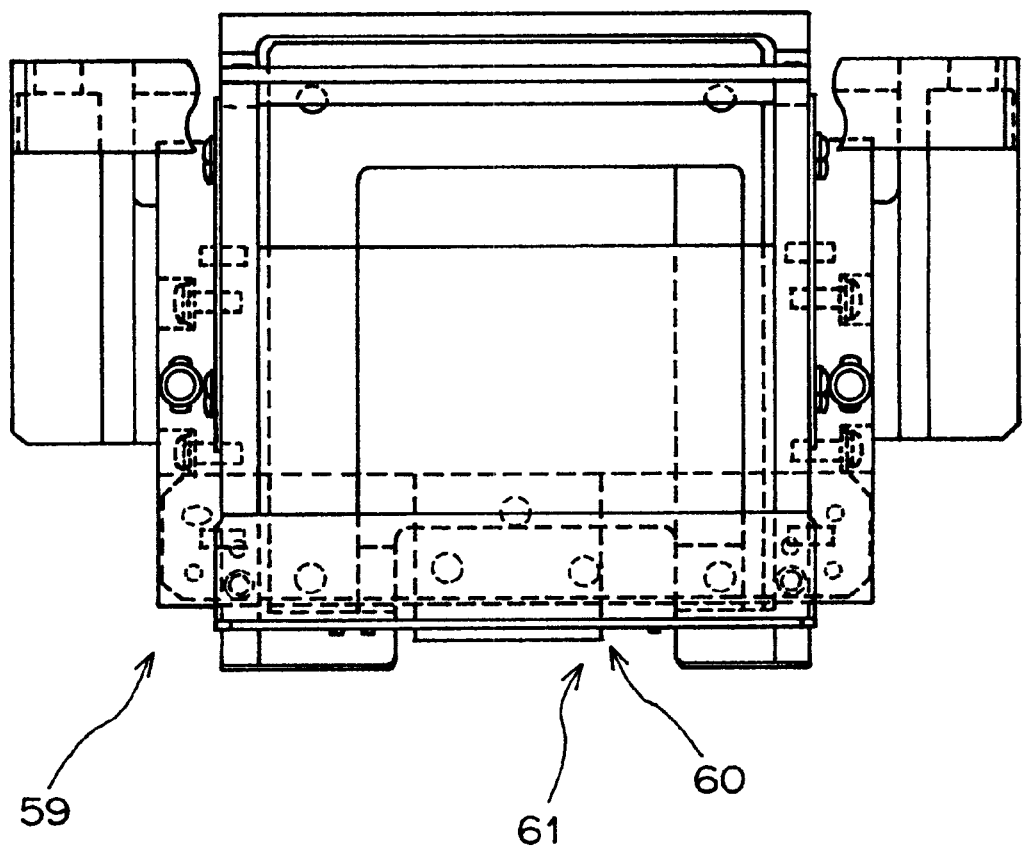
FIG. 25 is an illustration of a portion indicated with an arrow XXV in FIG. 23.
Figure 26:
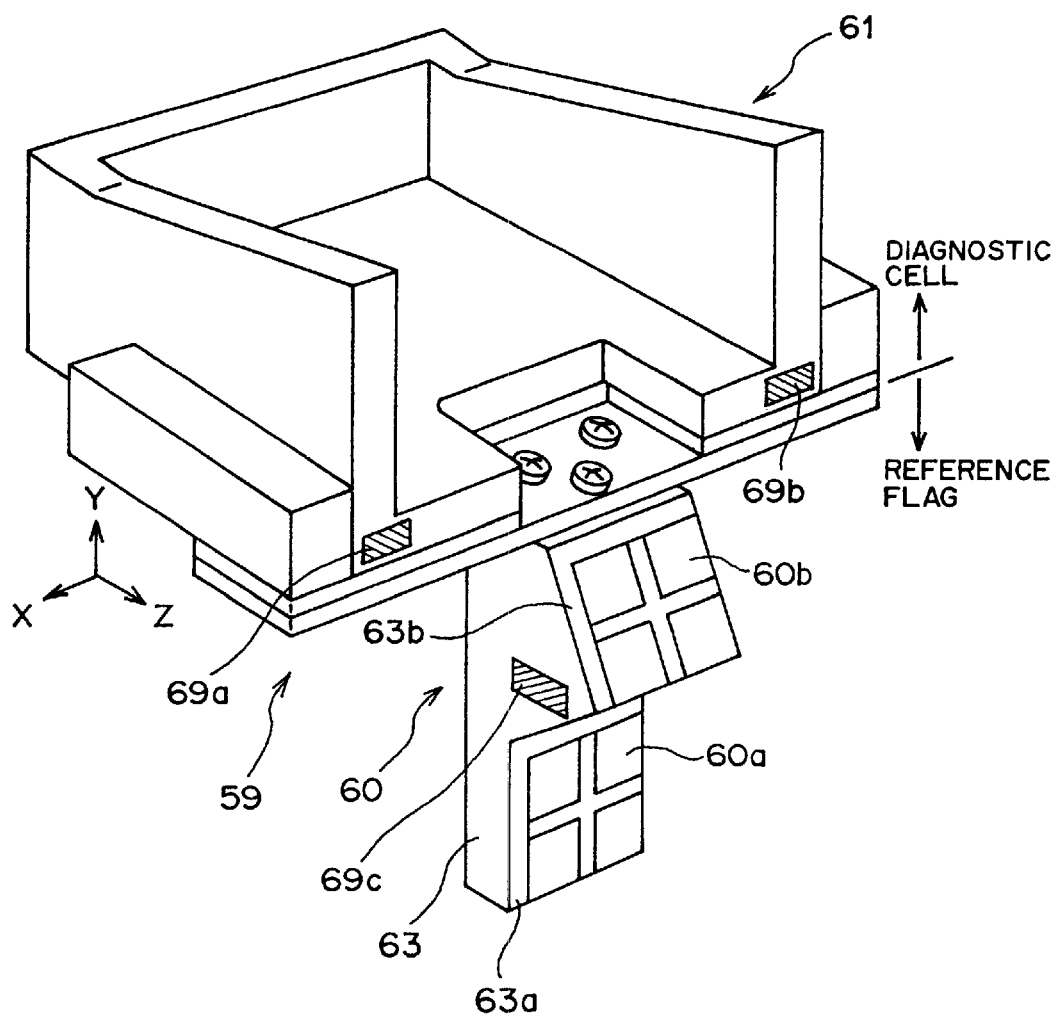
FIG. 26 is a perspective view showing an outline of the reference flag and the diagnostic cell in this embodiment.

FIG. 20 is a side elevational view showing the LAU 2 A including the reference flag and the diagnostic cell in this embodiment, FIG. 21 is a front elevational view showing an inner wall surface of the LAU 2A with the reference flag and the diagnostic cell in this embodiment, and FIG. 22 is a plan view showing the interior of the LAU 2A with the reference flag and the diagnostic cell in this embodiment. Of these drawings, FIG. 21 is an illustration taken along a line XXI—XXI of FIG. 20 and FIG. 22 is an illustration taken along a line XXII—XXII of FIG. 20. Further, FIG. 23 is a front elevational view showing the reference flag and the diagnostic cell in this embodiment, FIG. 24 is an illustration of a portion indicated by an arrow XXIV in FIG. 23, FIG. 25 is an illustration of a portion indicated by an arrow XXV in FIG. 23, and FIG. 26 is a perspective view schematically showing the reference flag and the diagnostic cell in this embodiment.

As shown in FIGS. 20 to 22, placed in the interior of the LAU 2A are a reference flag 60 to be read out through a photosensor (photoelectric sensor; not shown) on the accessor 7 side for detecting the absolute position of the accessor 7, and a diagnostic cell structure 61 into and from which a diagnostic cartridge 62 (see FIG. 20) is inserted and extracted by the accessor 7 to verify the operation of the accessor 7.

In addition to the aforesaid photosensor, the hand assembly 7a of the accessor 7 is equipped with a bar code reader (not shown) for reading out a bar code adhered to the cartridge 10.

The diagnostic cartridge 62 is for the purpose of verifying the operation of the accessor 7 as mentioned above, and is firmly made from iron or other materials to be substantially equal in configuration and weight to the cartridge 10.

Furthermore, in this embodiment, as shown in FIGS. 23 to 26, the insertion/extraction of the cartridge 10 into/from the storage rack 13 or the deck are made at two different angles (0° and 12°) as mentioned before, and hence, in the diagnostic cell structure 61, diagnostic cells 61a, 61b are constructed corresponding to the respective angles 0° and 12°.

A reference flag label adhering member 63 is integrally and fixedly fitted to a lower portion of the diagnostic cell structure 61. This reference flag label adhering member 63 has an adhering surface 63a for the insertion/extraction angle 0° and an adhering surface 63b for 12°, and a reference flag label 60a for 0° and a reference flag label 60b for 12°, which serve as the reference flag 60, are adhered to the adhering surfaces 63a, 63b, respectively.

In this embodiment, the reference flag 60 and the diagnostic cell structure 61 are disposed to be brought close to each other and integrated with each other in the above-mentioned way.

A bar code label adhering member 64 is fitted integrally to an upper portion of the diagnostic cell structure 61, and bar code labels 65, 66 for diagnosing the reading operation of the bar code reader on the accessor 7 side are adhered to the bar code label adhering member 64.

Two integrated structures 59 each comprising the reference flag 60 and the diagnostic cell structure 61 shown in FIGS. 23 to 26 are provided within the LAU 2A, and these integrated structures 59 are, as shown in FIGS. 20 to 22, disposed at a lower central portion of the LAU 2A in an opposed relation to each other in a state where the passage 9 for the accessor 7 is interposed therebetween. The integrated structure 59 on the front side of the LAU 2A (the left side in FIG. 20) is located right above the FES 15.

Moreover, a master label 65 is adhered as a bar code label to the bar code label adhering member 64 of the integrated structure 59 on the front side of the LAU 2A, while a diagnostic label 66 is adhered as a bar code label to the bar code label adhering member 64 of the integrated structure 5 9 on the rear side (the right side in FIG. 20) of the LAU 2A.

In this case, the master label 65 is read out by the bar code reader of the accessor 7 in order to verify the reading operation of the bar code reader, while the diagnostic label 66 is read out by the bar code reader of the accessor 7 in order to check whether or not the reading position (fitting position of the bar code reader) by the bar code reader is in a given range.

Incidentally, as shown in FIGS. 20 and 21, a reference flag adhering member 67 is placed right above the integrated structure 59 on the rear side of the LAU 2A, and a reference flag label 68 for 12° is adhered to the reference flag adhering member 67.

Furthermore, when adjusting the fitting positions of the reference flag 60 and the diagnostic cell structure 61 with respect to the X rail 8, as shown in FIG. 26, three portions: left and right portions of the front surface of the diagnostic cell structure 61 and a side surface of the reference flag label adhering member 63, are used as adjustment strike portions 69a to 69c.

In this embodiment, with the above-described arrangement, the reference flag 60 and the diagnostic cell structure 61 are integrated with each other into the integrated structure 59, and therefore, as compared with the prior art, its structure can extremely be simplified, and if the positional adjustment (accuracy adjustment) is done in terms of either the reference flag 60 or the diagnostic cell structure 61, the positional adjustment for both can automatically be accomplished.

Thus, it is possible to ensure the specification accuracy (for example, the demand accuracy ± 0.5 mm from the X rail 8) of the reference flag 60 and the diagnostic cell structure 61 while simplifying the accuracy adjustment of the reference flag 60 and the diagnostic cell structure 61. Whereupon, the error correction can certainly be made at the initial stage (initial operation), which allows the certain insertion/extraction of the cartridge 10 into/from the storage rack 13 or the deck.

In addition, since the reference flag 60 and the diagnostic cell structure 61 have the integral construction in a state of being brought close to each other, the moving distance (the distance between the reference flag 60 and the diagnostic cell structure 61) of the accessor 7 at the initial operation can extremely be shortened, thereby remarkably reducing the time needed for the initial operation of the accessor 7.

[5] Description of Positional Correction Relative Flag Structure

Furthermore, referring to FIGS. 27A to 30, a description will be made hereinbelow of a positional correction relative flag structure for use in the CSU4 in this embodiment.

Figure 27A:
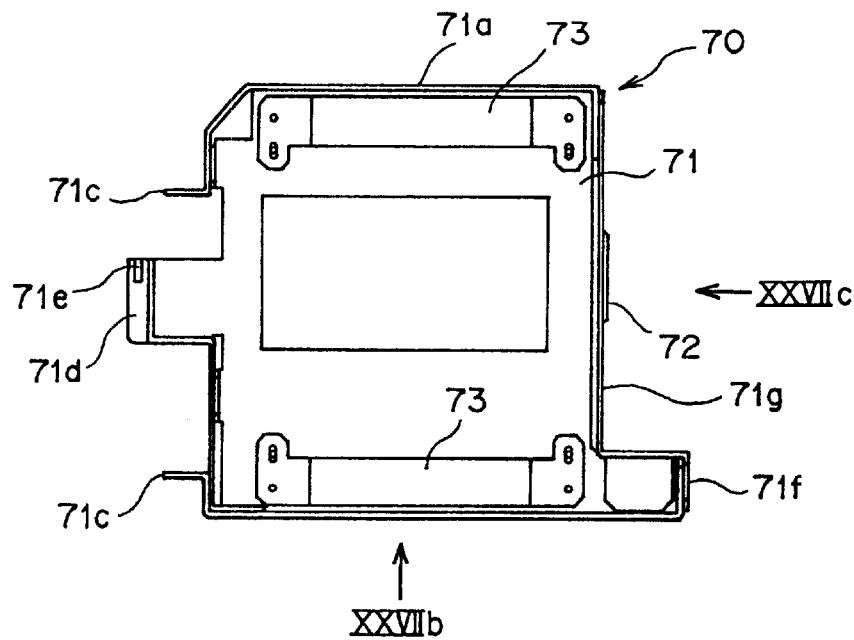
FIGS. 27A to 27C are respectively a plan view, a side elevational view (an illustration of a portion indicated by an arrow XXVIIb in FIG. 27A) and a front elevational view (an illustration of a portion indicated by an arrow XXVIIc in FIG. 27A) each showing a relative flag structure for the positional correction of a cartridge storage rack in this embodiment.
Figure 27B:
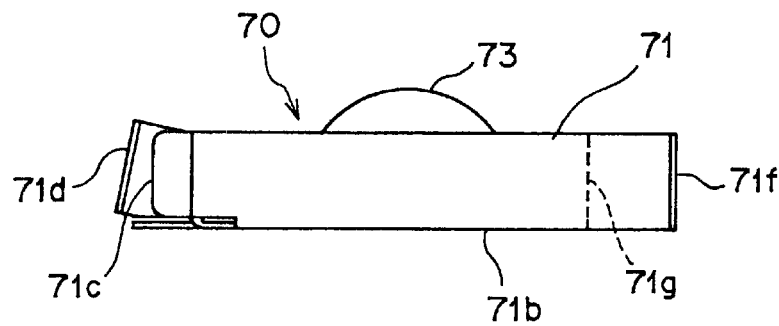
Figure 27C:
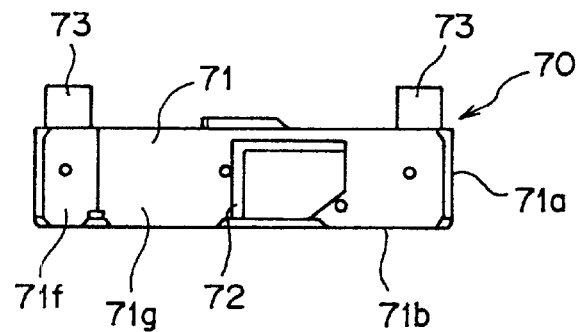
Figure 28:
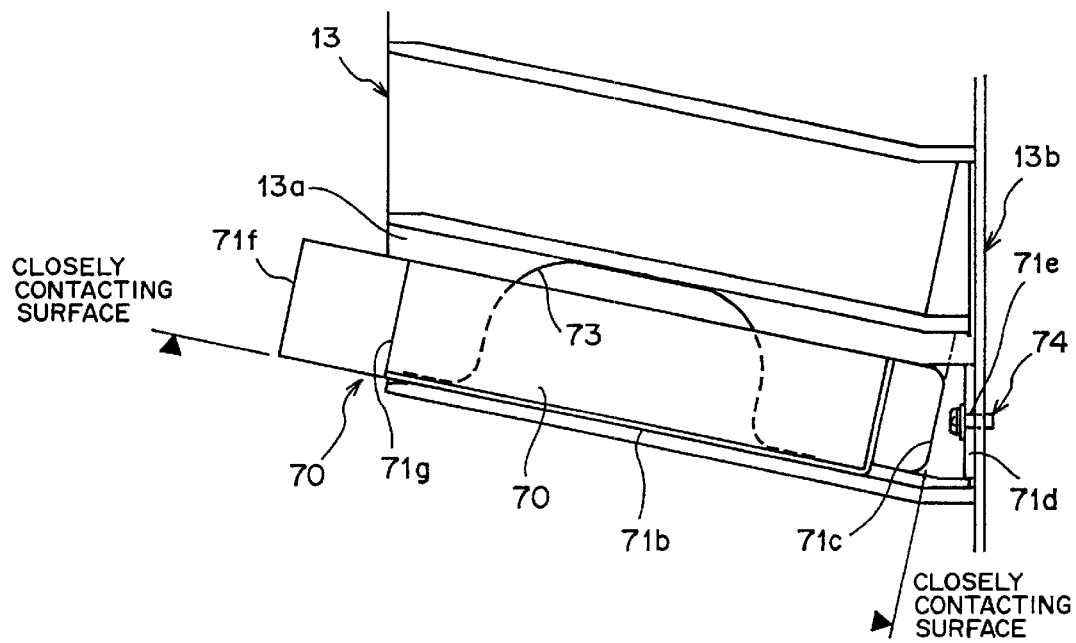
FIG. 28 is a side elevational view showing a state where the relative flag structure for the positional correction is placed within a cell of the cartridge storage rack.
Figure 29:
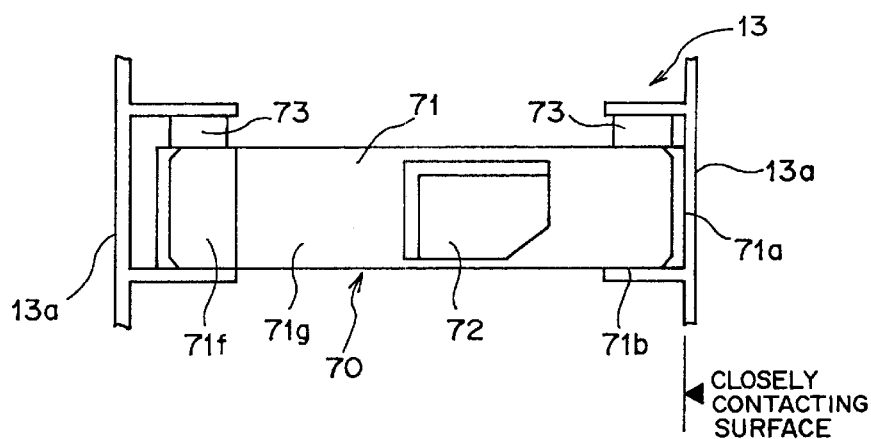
FIG. 29 is a front elevational view showing the state where the relative flag structure for the positional correction is placed within the cell of the cartridge storage rack.
Figure 30:
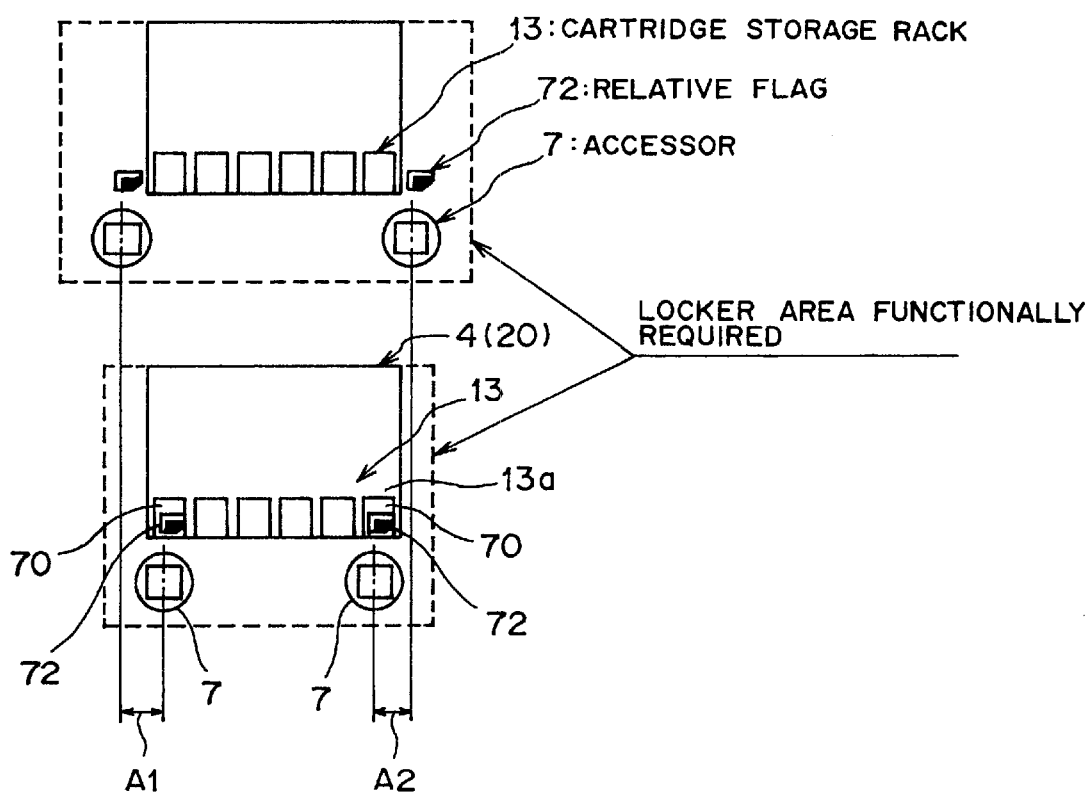
FIG. 30 is an illustration available for describing the cartridge storage efficiency improving effects attainable by the use of the positional correction relative flag structure in this embodiment by making a comparison with a prior structure.

FIGS. 27A to 27C are respectively a plan view, a side elevational view and a front elevational view each showing a positional correction relative flag structure in this embodiment. Of these drawings, FIG. 27B corresponds to a n illustration of a portion indicated with an arrow XXVIIb in FIG. 27A and FIG. 27C corresponds to an illustration of a portion indicated with an arrow XXVIIc in FIG. 27A. Further, FIGS. 28 and 29 are respectively a side elevational view and a front elevational view each showing a state where the positional correction relative flag structure in this embodiment is located within a cell 13a of the cartridge storage rack 13, and FIG. 30 is an illustration available for describing the improvement effects of the cartridge storage efficiency attainable as a result of the use of the positional correction relative flag structure in this embodiment as compared with a prior structure.

As shown in FIGS. 27A to 27C, a positional correction relative flag structure 70 in this embodiment is for correcting the position of the storage rack 13 with respect to the accessor 7, and is equipped with a body section 71 which is made to be inserted into a cell 13a of the storage rack 13 to be closely fixed to the cell 13a.

This body section 71 is of a sheet metal having an external shape similar to the cartridge 10 being stored in the cell 13a, and fitted to a front end surface 71g of the body section 71 is a relative flag 72 which is read out by a photosensor (not shown) on the accessor 7 side for the correction of the position of the storage rack 13.

In addition, attached to the body section 71 are pair of left and right plate springs (a biasing mechanism) 73, 73 which protrude upwardly from the body section 71. As shown in FIG. 29, the cell 13a is constructed by being divided into left and right sections to hold both sides of the cartridge 10 or the relative flag structure 70. As shown in FIGS. 28 and 29, each of the plate springs 73 is made to elastically deform by coming into contact with a ceiling surface of the cell 13a holding the side portions of the relative flag structure 70 when the body section 71 is inserted into the cell 13a, thereby functioning to allow a lower surface (a closely contacting surface in the Y direction) 71b of the body section 71 to be brought closely into contact with the cell 13a.

Furthermore, when inserting the body section 71 into the cell 13a and fixing it therein, a side surface 71a of the body section 71 is used as a closely contacting surface in the X direction and is brought closely into contact with the right side of the cell 13a as shown in FIG. 29 and further a pair of left and right backward projecting portions 71c, 71c formed on the rear end portion of the body section 71 to protrude therefrom are used as Z-direction closely contacting portions and are placed closely into contact with a cell plate 13b as shown in FIG. 28.

In this state, a contact portion 71d similarly protrusively formed on the rear end portion of the body section 71 is placed closely into contact with the cell plate 13b, as shown in FIG. 28. Further, a fixing screw 74 is set to penetrate a notch portion 71e made in the contact portion 71d and is tightened with respect to the cell plate 13b, so that the relative flag structure 70 is closely fixed to the cell 13a.

Besides, a Z-direction strike portion 71f is protrusively provided on the front end portion of the body section 71. In a manner of bringing the hand mechanism 7d of the accessor 7 into contact with the Z-direction strike portion 71f, it is possible to recognize the position in the depth direction (Z direction).

In this embodiment, the relative flag structure 70 described above is inserted into and placed in at least three cells 13a of the storage rack 13, and at the initial operation, the accessor 7 reads out the three relative flags 72 thereof through the use of a photosensor to know the position of the entire storage rack 13 to recognize the compartments of all the cells as a plane, and further creates meshes by the number of the cells to retain the center coordinates of the compartments of the respective cells 13a as a table.

Thereafter, the accessor 7 reads out the center coordinate of the compartment of a given cell 13a from the table and carries out the insertion/extraction of the cartridge 10 into/from the given cell 13a. Whereupon, the fitting dimension of the storage rack 13 is confirmable in terms of any one of the vertical directions (Y direction), the left- and right-hand directions (X direction) and the depth directions (Z direction), and that dimension is insurable.

As mentioned above, according to the positional correction relative flag structure 70 in this embodiment, the body section 71 to which the relative flag 72 is fitted is inserted into a cell 13 a of the storage rack 13 and closely fixed in this cell 13a, and therefore, the relative flag 72 can be disposed through the use of the cell 13a of the storage rack 13, thus suppressing the increase in the installation area and volume of the locker 20 (CSU4) occurring in conjunction with the location of the relative flag 72.

Accordingly, the cartridge storage efficiency can remarkably improve and the size reduction of the library apparatus 1 or 1' is achievable. In addition, because shortening the distance between a plurality of relative flags 72 as compared with that in the prior art, it is possible to considerably reduce the time necessary for the initial operation of the accessor 7.

For instance, as compared with a prior locker structure in which the relative flags 72 are placed on both external sides of the storage rack 13 as shown in an upper section of FIG. 30, the locker structure employing the relative flag structure 70 of this embodiment shown in a lower section of FIG. 30 is reducible by dimensions A1, A2 at its both sides, thus remarkably reducing the functionally required locker area and considerably shortening the moving distance of the accessor 7 at the initial operation.

In addition, in the relative flag structure 70 of this embodiment, since the body section 71 is biased by the plate spring 73 to be brought closely into contact with the cell 13a, the body section 71, i.e., the relative flag 72, can accurately be positioned with respect to the storage rack 13, thereby surely ensuring the dimension between the relative flag 72 and the compartment of the storage rack 13.

Moreover, since the relative flag structure 70 is put within the cell 13a, the relative flag structure 70 is protected by the cell 13a, thereby surely preventing the relative flag structure 70 from being injured and deformed at the transportation of the CSU4 (locker 20), and further enhancing the reliability.

What is claimed is:

1. A library apparatus comprising a storage rack for storing a number of cartridges each accommodating a storage medium, a deck for carrying out access to the storage medium within an individual cartridge of the number of cartridges, and an accessor for transferring the individual cartridge between said storage rack and said deck, and constructed by coupling a plurality of lockers in which a traveling passage for said accessor lies to pass through said plural lockers, wherein sheet metal columns having a substantially same structure are set vertically at corner portions of said plural lockers, and a plane reference plate having a vertical surface parallel to a direction of the coupling of said plural lockers and an edge surface perpendicular to the direction of the coupling of said plural lockers is attached to each of said sheet metal columns, with said vertical surface of said plane reference plate being used as a reference plane when positioning one of the adjacent lockers with respect to the other.

2. A library apparatus as defined in claim 1, wherein each of said lockers has a cable duct, located on a base of each said locker in the direction of the coupling of said plural lockers, for accommodating and guiding a cable, said cable duct being divided into three sections along the direction of the coupling of said plural lockers, a central section of the three divisions of said cable duct being fixed to each said locker, both end sections thereof being detachably attached to each said locker.

3. A library apparatus as defined in claim 2, wherein at least one of said lockers houses a shelf accommodating a plurality of printed boards functioning as a controller for said accessor, and an inserting direction of a screw for fitting a back panel of said shelf to said shelf assumes only a direction perpendicular to said back panel.

4. A library apparatus as defined in claim 1, wherein at least one of said lockers houses a shelf accommodating a plurality of printed boards functioning as a controller for said accessor, and an inserting direction of a screw for fitting a back panel of said shelf to said shelf assumes only a direction perpendicular to said back panel.

5. A library apparatus comprising:
   a plurality of lockers, coupled together as a unit, for defining both an external form and an internal passage of said library apparatus;
   a storage rack, disposed in at least one of said plural lockers, for storing a number of cartridges each accommodating a storage medium;
   a deck, disposed in at least one of said plural lockers, for carrying out access to the storage medium in an individual cartridge of said number of cartridges;
   an accessor, housed in at least one of said plural lockers, for moving through the internal passage of said library apparatus and transferring the individual cartridge between said storage rack and said deck; and
   means, attached inside of at least one of said plural lockers so as to pass through said plural lockers, for allowing said accessor to move through the internal passage of said library apparatus by guiding said accessor, said means including:
   a plurality of supporting members disposed in said plural lockers respectively, each of said plural supporting members having at each end thereof a positioning groove and being attached to a base of a corresponding one of said plural lockers such that when said corresponding one locker is coupled to any lockers adjacent to said one locker, each said supporting member is linked to the supporting members of the adjacent lockers while the positioning groove at each end thereof faces the positioning groove at a corresponding end of each of the adjacent supporting members, a rail, supported by said plural supporting members horizontally in a direction of the coupling of said plural lockers, for guiding said accessor along the direction of the coupling of said plural lockers within the internal passage of said library apparatus and positioning bars, each of which is fitted in the facing two positioning grooves of each adjacent two supporting members of said plural supporting members so as not to interfere with the movement of said accessor along said rail, and for positioning each said adjacent two supporting members with respect to each other, wherein each of said lockers has a cable duct, located on a base of each said lockers in the direction of the coupling of said plural lockers, for accommodating and guiding a cable, said cable duct being divided into three sections along the direction of the coupling of said plural lockers, a central section of the three divisions of said cable duct being fixed to each said locker, both end sections thereof being detachably attached to each said locker.

6. A library apparatus as defined in claim 5, wherein at least one of said plural lockers includes a flag member, fixed to a base of said at least one locker in the vicinity of the corresponding supporting member with a screw driven downwardly, for allowing said accessor to recognize a position of said accessor during operation of said accessor.

7. A library apparatus as defined in claim 5, wherein at least one of said lockers houses a shelf accommodating a plurality of printed boards functioning as a controller for said accessor, and an inserting direction of a screw for fitting a back panel of said shelf to said shelf assumes only a direction perpendicular to said back panel.

8. A library apparatus as defined in claim 7, wherein at least one of said plural lockers includes a flag member, fixed to a base of said at least one locker in the vicinity of the corresponding supporting member with a screw driven downwardly, for allowing said accessor to recognize a position of said accessor during operation of said accessor.

9. A library apparatus comprising:

a plurality of lockers, coupled together as a unit, for defining both an external form and an internal passage of said library apparatus;

a storage rack, disposed in at least one of said plural lockers, for storing a number of cartridges each accommodating a storage medium;

a deck, disposed in at least one of said plural lockers, for carrying out access to the storage medium in an individual cartridge of said number of cartridges;

an accessor, housed in at least one of said plural lockers, for moving through the internal passage of said library apparatus and transferring the individual cartridge between said storage rack and said deck; and means, attached inside of at least one of said plural lockers so as to pass through said plural lockers, for allowing said accessor to move through the internal passage of said library apparatus by guiding said accessor, said means including:

a plurality of supporting members disposed in said plural lockers respectively, each of said plural supporting members having at each end thereof a positioning groove and being attached to a base of a corresponding one of said plural lockers such that when said corresponding one locker is coupled to any lockers adjacent to said one locker, each said supporting member is linked to the supporting members of the adjacent lockers while the positioning groove at each end thereof faces the positioning groove at a corresponding end of each of the adjacent supporting members, a rail, supported by said plural supporting members horizontally in a direction of the coupling of said plural lockers, for guiding said accessor along the direction of the coupling of said plural lockers within the internal passage of said library apparatus and positioning bars, each of which is fitted in the facing two positioning grooves of each adjacent two supporting members of said plural supporting members so as not to interfere with the movement of said accessor along said rail, and for positioning each said adjacent two supporting members with respect to each other, wherein at least one of said lockers houses a shelf accommodating a plurality of printed boards functioning as a controller for said accessor, and an inserting direction of a screw for fitting a back panel of said shelf to said shelf assumes only a direction perpendicular to said back panel.

10. A library apparatus as defined in claim 9, wherein at least one of said plural lockers includes a flag member, fixed to a base of said at least one locker in the vicinity of the corresponding supporting member with a screw driven downwardly, for allowing said accessor to recognize a position of said accessor during operation of said accessor.

* * * * *